United States Patent
Chong et al.

(10) Patent No.: US 9,641,866 B2
(45) Date of Patent: May 2, 2017

(54) APPLYING PARTITION-BASED FILTERS

(75) Inventors: In Suk Chong, San Diego, CA (US);
Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1046 days.

(21) Appl. No.: 13/585,657

(22) Filed: Aug. 14, 2012

(65) Prior Publication Data

US 2013/0044809 A1 Feb. 21, 2013

Related U.S. Application Data

(60) Provisional application No. 61/525,128, filed on Aug. 18, 2011, provisional application No. 61/525,606, (Continued)

(51) Int. Cl.
*H04N 7/26* (2006.01)
*H04N 19/117* (2014.01)
(Continued)

(52) U.S. Cl.
CPC ......... *H04N 19/649* (2014.11); *H04N 19/117* (2014.11); *H04N 19/167* (2014.11);
(Continued)

(58) Field of Classification Search
CPC ...... H04N 19/82; H04N 19/117; H04N 19/86; H04N 19/439; G06T 2207/20192
See application file for complete search history.

(56) References Cited

U.S. PATENT DOCUMENTS

| 2010/0158103 A1 | 6/2010 | Ye et al. |
| 2010/0226432 A1 | 9/2010 | Wittmann et al. |

(Continued)

FOREIGN PATENT DOCUMENTS

| CN | 102098501 | 6/2011 |
| CN | 102131082 A | 7/2011 |

(Continued)

OTHER PUBLICATIONS

ITU-T H.265, Series H: Audiovisual and Multimedia Systems, Infrastructure of audiovisual services—Coding of moving video, High efficiency video coding, The International Telecommunication Union, Apr. 2013, 317 pp.

(Continued)

*Primary Examiner* — Obafemi Sosanya
(74) *Attorney, Agent, or Firm* — Shumaker & Sieffert, P.A.

(57) ABSTRACT

In general, techniques are described for applying partition-based filters when coding video data. A device comprising at least one processor may be configured to implement the techniques. The processor selects a filter to apply near a boundary of a first portion of the video data and determines at least one of the plurality of filter coefficients of the selected filter for which the video data will not be available to be filtered. Based on the determination, the processor determines a partial filter that does not include the at least one of the plurality of filter coefficients for which the video data will not be available to be filtered. The processor renormalizes the plurality of filter coefficients included within the partial filter and applies the renormalized partial filter near the boundary of the first portion of the video data to generate a filtered first portion of the video data.

40 Claims, 9 Drawing Sheets

Related U.S. Application Data filed on Aug. 19, 2011, provisional application No. 61/531,528, filed on Sep. 6, 2011.

(51) Int. Cl.

| | | |
|---|---|---|
| *H04N 19/60* | (2014.01) | |
| *H04N 19/64* | (2014.01) | |
| *H04N 19/182* | (2014.01) | |
| *H04N 19/82* | (2014.01) | |
| *H04N 19/167* | (2014.01) | |
| *H04N 19/85* | (2014.01) | |
| *H04N 19/86* | (2014.01) | |
| H04N 19/96 | (2014.01) | |
| H04N 19/42 | (2014.01) | |

(52) U.S. Cl.
CPC ......... *H04N 19/182* (2014.11); *H04N 19/647* (2014.11); *H04N 19/82* (2014.11); *H04N 19/85* (2014.11); *H04N 19/86* (2014.11); *H04N 19/42* (2014.11); *H04N 19/60* (2014.11); *H04N 19/96* (2014.11)

(56) References Cited

U.S. PATENT DOCUMENTS

| | | | |
|---|---|---|---|
| 2010/0316139 | A1 | 12/2010 | Le Leannec et al. |
| 2010/0329361 | A1 | 12/2010 | Choi et al. |
| 2011/0144489 | A1* | 6/2011 | Kwak ................ G01S 7/5205 600/437 |
| 2011/0176742 | A1 | 7/2011 | Fukuhara et al. |
| 2012/0106624 | A1* | 5/2012 | Huang ................ H04N 19/117 375/240.02 |
| 2013/0136371 | A1* | 5/2013 | Ikai ........................ G06T 5/001 382/224 |
| 2013/0156111 | A1 | 6/2013 | Lee et al. |
| 2014/0086501 | A1 | 3/2014 | Ikeda et al. |

FOREIGN PATENT DOCUMENTS

| | | |
|---|---|---|
| JP | 2013118605 A | 6/2013 |
| JP | 2014517555 A | 7/2014 |
| WO | 2006128081 A2 | 11/2006 |
| WO | 2007032602 A1 | 3/2007 |
| WO | 2009126937 A1 | 10/2009 |
| WO | 2011125445 A1 | 10/2011 |
| WO | 2012005521 A2 | 1/2012 |
| WO | 2012152174 A1 | 11/2012 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-E603_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-J1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Chen et al., "Neville-Lagrange wavelet family for lossless image compression," vol. 88, No. 11, Nov. 1, 2008, pp. 2833-2842.
Chen et al., "Adaptive Loop Filter with Zero Pixel Line Buffers for LCU-based Decoding," JCTVC-F054, 6th Meeting: Torino, IT, Jul. 14-22, 2011, 11 pp.
Davies et al., "Suggestion for a Test Model," JCTVC-A033, 1st Meeting: Dresden, DE, Apr. 15-23, 2010, 30 pp.
Fu et al., "Sample Adaptive Offset with Zero Pixel Line Buffers for LCU-based Decoding," JCTVC-F055, 6th Meeting: Torino, IT, Jul. 14-22, 2011, 8 pp.
Hsu et al., "Deblocking Filter with Reduced Pixel Line Buffers for LCU-based Processing," JCTVC-F053, 6th Meeting: Torino, IT, Jul. 14-22, 2011, 7 pp.
International Search Report and Written Opinion—PCT/US2012/050960—ISA/EPO—Jan. 3, 2013, 22 pp.
Chang et al., "Transform Coding of Arbitrarily-Shaped Image Segments," Proceedings of the ACM International Conference on Multimedia, New York, NY, Aug. 2, 1993, pp. 83-90.
Karczewicz et al., "Video coding technology proposal by Qualcomm," JCTVC-A121, 1st Meeting: Dresden, DE, Apr. 15-23, 2010, 25 pp.
List et al., "Adaptive Deblocking Filter," IEEE Transactions on Circuits and Systems for Video Technology, IEEE Service Center, Piscataway, NJ, US, vol. 13, No. 7, Jul. 2003, pp. 614-619.
Maitre et al., "Depth and depth-color coding using shape-adaptive wavelets," J. Vis. Commun. Image R. 21 (2010): 513-522.
Invitation to Pay Additional Fees from international application No. PCT/US2012/050960, dated Nov. 5, 2012, 10 pp.
Rusert et al., "Optimized Quantization in Interframe Wavelet Coding," International Organization for Standardization Organisation Internationale DE Normalisation ISO/IEC JTC1/SC29/WG11 Coding of Moving Pictures and Associated Audio, Oct. 2012, Shanghai, 8 pp.
Alshina et al., "CE3: Experimental Results of DCTIF by Samsung," JCTVC-D344, 4th Meeting: Daegu, KR, Jan. 20-28, 2011, 15 pp.
Auyeung et al., "Separable Adaptive Loop Filter," JCTVC-B110, 2nd Meeting: Geneva, CH, Jul. 21-28, 2010, 10 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 pp.
Reply to Written Opinion dated Jan. 3, 2013, from international application No. PCT/US2012/050960, dated Jun. 17, 2013, 32 pp.
Second Written Opinion of international application No. PCT/US2012/050960, dated Sep. 16, 2013, 5 pp.
International Preliminary Report on Patentability dated Jan. 10, 2014 from international application No. PCT/US2012/050960, 23 pp.
Wang, et al., "Dependency and loop filtering control over tile boundaries", MPEG Meeting; Nov. 28-Dec. 2, 2011; Geneva; (Motion Picture Expert Group or ISO/IEC JTC1/SC29NVG11), No. JCTVCG317, XP030050442, 7 pp.
Chen, et al., "Non-CE8.c.6 Multi-source SAO and ALF virtual boundary processing with cross9×9," Nov. 21-30, 2011, Joint Collaborative Team on Video Coding (JCT-VC) of ITU-T SG16 WF3 and ISO/IEC JTC1/SC29/WG11, 7th Meeting Geneva, CH, Nov. 13, 2011, JCTVC-G211_r1, 23 pp.
Chen, et al., "Non-CE8.c.7 Single-source SAO and ALF virtual boundary processing with cross9×9," Nov. 21-30, 2011, Joint Collaborative Team on Video Coding (JCT-VC) of ITU-T SG16 WP3 and ISO/IEC JTC1/SC29/WG11, 7th Meeting Geneva, CH, Nov. 13, 2011, JCTVC-G212_r1, 25 pp.

(56) References Cited

OTHER PUBLICATIONS

Chen, et al., "Non-CE8.c.7: Single-source SAO and ALF virtual boundary processing with cross9×9," Nov. 21-30, 2011 7th JCT-VC Meeting; No. JCTVC-G212, Nov. 8, 2011, 11 slides.
Chen, et al., "Non-CE8.c.7: Single-source SAO and ALF virtual boundary processing with cross9×9," Nov. 21-30, 2011 7th JCT-VC Meeting; No. JCTVC-G212_v4, Nov. 21, 2011, 25 pp.
Chen, et al., "Non-CE8.c.7: Single-source SAO and ALF virtual boundary processing with cross9×9," Nov. 21-30, 2011 7th JCT-VC Meeting; No. JCTVC-G212_v4, Section 8.3.3; Derivation process for filter index array for luma samples, Nov. 21, 2011, 6 pp.
Chen, et al., "Non-CE8.c.7: Single-source SAO and ALF virtual boundary processing with cross9×9," Nov. 21-30, 2011 7th JCT-VC Meeting; No. JCTVC-G212_v4, Section 8.6.2.1.1; Modification process for lua and chroma samples, Nov. 21, 2011, 6 pp.
Bossen, "Common Test Conditions and Software Reference Configurations," Joint Collaborative Team on Video coding (JCT-VC), ITU-T SG16 WP3 and ISO/IEC JTC1/SC29/WG1, 6th Meeting: Torino, IT, JCTVC-F900, Jul. 14-22, 2011, 3 pp.
Chen, et al., "CE8.c.4: SAO and ALF Virtual Boundary Processing with Cross9×9," Joint Collaborative Team on Video coding (JCT-VC) of ITU-T SG16 WP3 and ISO/IEC JTC1/SC29/WG11, 7th Meeting Geneva, CH, JCTVC-G206, Nov. 20-30, 2011, 5 pp.
Tsai, et al., "CE8.d.1: Snowllake5×5 and cross9×9 for Luma and Chroma ALF Shapes", Joint Collaborative Team on Video Coding (JCT-VC) of ITU-T SG16 WP3 and ISO/IEC JTC1/SC29/WG11, Nov. 21-30, 2011; 7th Meeting: Geneva, CH, JCTVC-G208, Jun. 17, 2016, 4 pp.
Yamakage, et al., "Description of Core Experiment 8 (CE8): Non-deblocking loop filtering", JCT-VC Meeting; MPEG Meeting; Jul. 14-22, 2011; Torino; (Joint Collabor4tive Team on Video Coding of ISO/IEC JTC1/SC29/WG11 and ITU-T SG.16); URL: http://wftp3.itu.int/av-arch/Jctvc-site, No. JCTVC-F908, Aug. 29, 2011, XP030009809, 17 pp.
Esenlik, et al., "Line Memory Reduction for ALF Decoding," Joint Collaborative Team on Video Coding (JCT-VC) of ITU-T SG16 WP3 and ISO/IEC JTC1/SC29/WG11, 5th Meeting: Geneva, CH, Mar. 16-23, 2011, JCTVC-E225_r1'; Mar. 17, 2011; 10 pp.
Bossen, "Common Test Conditions and Software Reference Configurations," Joint Collaborative Team on Video coding (JCT-VC) of ITU-T SG16 WP3 and ISO/IEC JTC1/SC29/WG11, JCTVC-E700 WG11 No. m20235, Jan. 20-28, 2011; 4th Meeting: Daegu, KR, Apr. 25, 2011, 11 pp.
Boyce, "Changes to Adaptive Reference Picture Weighting," 5th Meeting: Geneva, CH, Oct. 9-17, 2002, (Joint Video Team (JVT) of ISO/IEC MPEG & ITU-T VCEG (ISO/IEC JTC1/SC29/WG11 and ITU-T SG16 Q.6); JVT-E060, Oct. 16, 2002, 7 pp.
Budagavi, et al., "Chroma ALF with Reduced Vertical Filter Size," Joint Collaborative Team on Video Coding (JCTVC) of ITU-T SG16 WP3 and ISO/IEC JTC1/SC29/WG11, Mar. 16-23, 2011, JCTVC-E287, 5th Meeting: Geneva, CH, Mar. 10, 2011, 6 pp.
Fu, et al., "CE13: Sample Adaptive Offset with LCU-Independent Decoding", Joint Collaborative Team on Video coding (JCT-VC) of ITU-T SG16 WP3 and ISO/IEC JTC1/SC29/WG11 5th Meeting: Geneva, CH, Mar. 16-23, 2011, U.S., JCTVC, Mar. 10, 2011, JCTVC-E049, 6 pp.
Ikeda, et al., "CE12 Subset2: Parallel Deblocking Filter," Joint Collaborative Team on Video Coding (JCT-VC) of ITU-T SG16 WP3 and ISO/IEC JTC1/SC29/WG11, Mar. 16-23, 2011; JCTVC-E181, 5th Meeting: Geneva, CH, Mar. 14, 2011, 11 pp.
Narroschke, et al., "CE12.2: Results for Parallel Deblocking Filter Decisions," Joint Collaborative Team on Video coding (JCT-VC) of ITU-T SG16 WP3 and ISO/IEC JTC1/SC29/WG11, Mar. 16-23, 2011; JCTVC-E224, WG11 No. m19747, 5th Meeting: Geneva, CH, Mar. 17, 2011; 10 pp.
Narroschke, et al., "Results for a Straight Forward Combination of Parallel Deblocking Techniques JCTVC-E224 and Item 2 of JCTVC-E181," Mar. 16-23, 2011; Joint Collaborative Team on Video Coding (JCT-VC) of ITU-T SG16 WP3 and ISO/IEC JTC1/SC29/WG11, JCTVC-E496, WG11 No. m20226, 5th Meeting: Geneva, CH, Mar. 21, 2011; 3 pp.

\* cited by examiner

US 9,641,866 B2

APPLYING PARTITION-BASED FILTERS

This application claims the benefit of U.S. Provisional Application No. 61/525,128, filed Aug. 18, 2011, U.S. Provisional Application No. 61/525,606, filed Aug. 19, 2011 and U.S. Provisional Application No. 61/531,528, filed Sep. 6, 2011, where the entire contents of each of these U.S. Provisional Applications is incorporated herein by reference.

TECHNICAL FIELD

This disclosure relates to data compression and, more particularly, data compression involving partition-based filters.

BACKGROUND

Data compression is widely used in a variety of applications to reduce consumption of data storage space, transmission bandwidth, or both. Example applications of data compression include visible or audible media data coding, such as digital video, image, speech, and audio coding. Digital video coding, for example, is used in a wide range of devices, including digital televisions, digital direct broadcast systems, wireless communication devices, personal digital assistants (PDAs), laptop or desktop computers, tablet computers, digital cameras, digital recording devices, video gaming devices, cellular or satellite radio telephones, or the like. Digital video devices implement video compression techniques in accordance with standards, such as an MPEG-2 standard, an MPEG-4 standard, an H.264/MPEG-4 Advanced Video Coding (AVC) standard, or the emerging High Efficiency Video Coding (HEVC) standard (which is sometimes referred to as the emerging H.265 standard) to transmit and receive digital video more efficiently.

Video compression techniques may perform spatial prediction, motion estimation and motion compensation to reduce or remove redundancy inherent in video data. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching units (which may be referred to as blocks in various video coding standards, such as the H.264/MPEG-4 AVC standard) between two or more adjacent frames. Motion estimation generates motion vectors, which indicate the displacement of units of a current frame relative to corresponding units in one or more reference frames. Motion compensation uses the motion vector to generate prediction data from a reference frame. After motion compensation, residual data is formed by subtracting the prediction data from the original unit.

A video encoder then applies a transform followed by quantization and lossless statistical coding processes to further reduce the bit rate of the residual data produced by the video coding process. In some instances, the applied transform comprises a discrete cosine transform (DCT). The DCT coefficients produced from applying a DCT to the residual data then undergo quantization and lossless statistical coding processes (commonly known as "entropy coding" processes) to generate a bitstream. Examples of statistical coding processes include context-adaptive variable length coding (CAVLC) or context-adaptive binary arithmetic coding (CABAC). A video decoder receives the encoded bitstream and performs lossless decoding to decompress the DCT coefficients, which the video decoder then transforms back into the spatial domain through application of one or more inverse DCTs (IDCTs) to form residual data for each of the units. Using the residual data and motion information, the video decoder reconstructs the encoded video.

SUMMARY

In general, this disclosure is directed to techniques for coding video data through application of one or more partition-based filters, such as a de-blocking (DB) filter a sample adaptive offset (SAO) filter and/or an adaptive loop (AL) filter (which is sometimes also denoted as "ALF"). The techniques may enable a video coder, which may generally refer to a video encoder and/or a video decoder, to perform a number of techniques when applying these filters that may reduce buffer capacity required to implement these filters in comparison to conventional implementations of adaptive loop filters while also potentially reducing visual quality issues that occur in conventional implementations of these type of filters.

In operation, a video coder may decode video data, either to reconstruct video data for encoding purposes (e.g., for comparison when perform motion estimation/compensation for temporal prediction) or for decoding purposes (e.g., for playback or storage purposes). Once the video data is reconstructed, the video coder may then apply the filters to smooth differences that may arise across boundaries separating blocks of video data. This differences often result due to quantization (which is effectively another way to refer to rounding), which the video coder may perform to remove high-order transform coefficients and thereby compress the video data. One block of video data may be quantized in a manner that alters that block of video data such that inconsistencies in the block of video data may arise when viewed next to an adjacent block of video data (which may include inconsistencies as well). The video coder may then apply one or more filters across this boundary to diminish these inconsistencies (which are often referred to as "blockiness artifacts," where the term "blockiness" refers to the aspect of video coding involving dividing the video data into blocks).

Often the video coder applies three filters, one after another, with the result of applying the first filter is then filtered by the second filter, and so on. To improve the speed with which these filters may be applied, the techniques may enable the video coder to eliminate certain coefficients of these filters to generate what may be referred to as "partial filters." These partial filters may be more readily applied to the result produced by the next filter, as less rows of pixels may be filtered by the partial filters. Moreover, considering that these filters are applied across block boundaries, often application of these filters may require that rows of previous blocks need to be buffered. The techniques may enable the video coder to remove filter coefficients aligned in the vertical direction so as to reduce buffer requirements, as less rows may be filtered, potentially reducing buffer requirements while also promoting more efficient application of these filters.

In one aspect, a method of coding video data to generate reconstructed video data comprises, when decoding the encoded video data, performing mirror padding to mirror pixel values located at a boundary of a first portion of the reconstructed video data so as to replace pixel values of a second portion of the video data that are not available. The boundary separates the first portion of the video data from the second portion of the video data. The method also comprises applying one or more filters to filter at least one of the mirrored pixel values.

In another aspect, a device to code video data to generate reconstructed video data comprises means for performing, when decoding the encoded video data, mirror padding to mirror pixel values located at a boundary of a first portion of the reconstructed video data so as to replace pixel values of a second portion of the video data that are not available. The boundary separates the first portion of the video data from the second portion of the video data. The device further comprises means for applying one or more filters to filter at least one of the mirrored pixel values.

In another aspect, a device to code encoded video data to generate reconstructed video data comprises one or more processors configured to, when decoding the encoded video data, perform mirror padding to mirror pixel values located at a boundary of a first portion of the reconstructed video data so as to replace pixel values of a second portion of the video data that are not available. The boundary separates the first portion of the video data from the second portion of the video data. The one or more processors are also configured to apply one or more filters to filter at least one of the mirrored pixel values.

In another aspect, a non-transitory computer-readable storage medium comprising instructions stored thereon that, when executed, cause one or more processors of a device to, when decoding encoded video data to generate reconstructed video data, perform mirror padding to mirror pixel values located at a boundary of a first portion of the reconstructed video data so as to replace pixel values of a second portion of the video data that are not available, wherein the boundary separates the first portion of the video data from the second portion of the video data, and apply one or more filters to filter at least one of the mirrored pixel values.

In another aspect, a method of coding video data comprises selecting a filter to apply near a boundary of a first portion of the video data that separates the first portion of the video data from a second portion of the video data, wherein the filter comprises a plurality of filter coefficients. The method further comprises determining at least one of the plurality of filter coefficients for which the video data will not be available to be filtered and based on the determination of the at least one of the plurality of filter coefficients for which the video data will not be available to be filtered, determining a partial filter, wherein the partial filter does not include the at least one of the plurality of filter coefficients for which the video data will not be available to be filtered. The method further comprises renormalizing the plurality of filter coefficients included within the partial filter and applying, with the device, the renormalized partial filter near the boundary of the first portion of the video data to generate a filtered first portion of the video data.

In another aspect, a device for coding video data comprises means for selecting a filter to apply near a boundary of a first portion of the video data that separates the first portion of the video data from a second portion of the video data, wherein the filter comprises a plurality of filter coefficients. The device further comprises means for determining at least one of the plurality of filter coefficients for which the video data will not be available to be filtered and, based on the determination of the at least one of the plurality of filter coefficients for which the video data will not be available to be filtered, means for determining a partial filter, wherein the partial filter does not include the at least one of the plurality of filter coefficients for which the video data will not be available to be filtered. The device also comprises means for renormalizing the plurality of filter coefficients included within the partial filter and means for applying the renormalized partial filter near the boundary of the first portion of the video data to generate a filtered first portion of the video data.

In another aspect, a device for coding video data comprises one or more processors configured to select a filter to apply near a boundary of a first portion of the video data that separates the first portion of the video data from a second portion of the video data, wherein the filter comprises a plurality of filter coefficients. The one or more processors are also configured to determine at least one of the plurality of filter coefficients for which the video data will not be available to be filtered and, based on the determination of the at least one of the plurality of filter coefficients for which the video data will not be available to be filtered. The one or more processors are also configured to determine a partial filter, wherein the partial filter does not include the at least one of the plurality of filter coefficients for which the video data will not be available to be filtered, renormalize the plurality of filter coefficients included within the partial filter and apply the renormalized partial filter near the boundary of the first portion of the video data to generate a filtered first portion of the video data.

In another aspect, a non-transitory computer-readable storage medium comprises instructions stored thereon that, when executed, cause one or more processors of a device to select a filter to apply near a boundary of a first portion of the video data that separates the first portion of the video data from a second portion of the video data, wherein the filter comprises a plurality of filter coefficients, determine at least one of the plurality of filter coefficients for which the video data will not be available to be filtered, based on the determination of the at least one of the plurality of filter coefficients for which the video data will not be available to be filtered, determine a partial filter, wherein the partial filter does not include the at least one of the plurality of filter coefficients for which the video data will not be available to be filtered, renormalize the plurality of filter coefficients included within the partial filter and apply the renormalized partial filter near the boundary of the first portion of the video data to generate a filtered first portion of the video data.

The details of one or more aspects of the techniques are set forth in the accompanying drawings and the description below. Other features, objects, and advantages of the techniques described in this disclosure will be apparent from the description and drawings, and from the claims.

DETAILED DESCRIPTION

Figure 1:
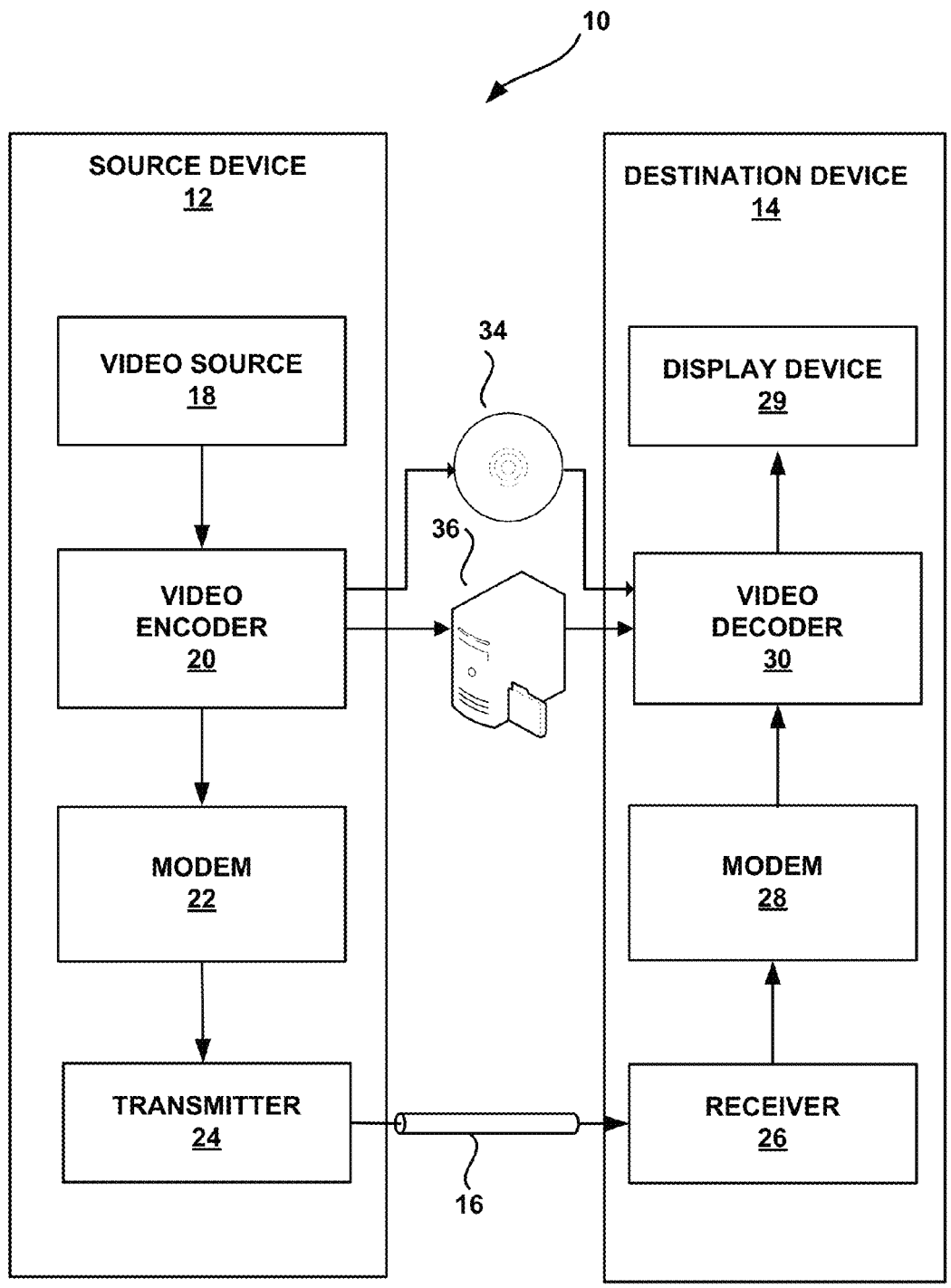
FIG. 1 is a block diagram illustrating a video encoding and decoding system that may implement techniques of this disclosure.

FIG. 1 is a block diagram illustrating a video encoding and decoding system 10 that may implement techniques of this disclosure. As shown in the example of FIG. 1, system 10 includes a source device 12 that generates encoded video for decoding by destination device 14. Source device 12 may transmit the encoded video to destination device 14 via communication channel 16 or may store the encoded video on a storage medium 34 or a file server 36, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, communication channel 16 may comprise a wireless channel. Alternatively, communication channel 16 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 16 may form part of a packet-based network, such as a local area network (LAN), a wide-area network (WAN), or a global network such as the Internet. Communication channel 16, therefore, generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

As further shown in the example of FIG. 1, source device 12 includes a video source 18, video encoder 20, a modulator/demodulator 22 ("modem 22") and a transmitter 24. In source device 12, video source 18 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones. The techniques described in this disclosure, however, are not limited to wireless applications or settings, and may be applied to non-wireless devices including video encoding and/or decoding capabilities. Source device 12 and destination device 16 are, therefore, merely examples of coding devices that can support the techniques described herein.

Video encoder 20 may encode the captured, pre-captured, or computer-generated video. Once encoded, video encoder 20 may output this encoded video to modem 22. Modem 22 may then modulate the encoded video according to a communication standard, such as a wireless communication protocol, whereupon transmitter 24 may transmit the modulated encoded video data to destination device 14. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later retrieval, decoding and consumption. The storage medium 34 may include Blu-ray discs, DVDs, CD-ROMs, flash memory, or any other suitable digital storage media for storing encoded video. Destination device 14 may access the encoded video stored on the storage medium 34 or the file server 36, decode this encoded video to generate decoded video and playback this decoded video.

File server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. Destination device 14 may access file server 36 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video data stored on a file server.

Destination device 14, in the example of FIG. 1, includes a receiver 26, a modem 28, a video decoder 30, and a display device 29. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding the associated encoded video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 29 of destination device 14 represents any type of display capable of presenting video data for consumption by a viewer. Although shown as integrated with destination device 14, display device 29 may be integrated with, or external to, destination device 14. In some examples, destination device 14 may include an integrated display device and also be configured to interface with an external display device. In other examples, destination device 14 may be a display device. In general, display device 29 displays the decoded video data to a user, and may comprise any of a variety of display devices such as a liquid crystal display (LCD), a plasma display, an organic light emitting diode (OLED) display, or another type of display device.

This disclosure may generally refer to video encoder 20 "signaling" the syntax information to another device, such as video decoder 30. It should be understood, however, that video encoder 20 may signal information by associating the syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data used to decode the compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

HM refers to a block of video data as a coding unit (CU). In general, a CU has a similar purpose to a macroblock coded according to H.264, except that a CU does not have the size distinction associated with the macroblocks of H.264. Thus, a CU may be split into sub-CUs. In general, references in this disclosure to a CU may refer to a largest coding unit (LCU) of a picture or a sub-CU of an LCU. For example, syntax data within a bitstream may define the LCU, which is a largest coding unit in terms of the number of pixels. An LCU may be split into sub-CUs, and each sub-CU may be split into sub-CUs. Syntax data for a bitstream may define a maximum number of times an LCU may be split, referred to as a maximum CU depth. Accordingly, a bitstream may also define a smallest coding unit (SCU).

An LCU may be associated with a hierarchical quadtree data structure. In general, a quadtree data structure includes one node per CU, where a root node corresponds to the LCU. If a CU is split into four sub-CUs, the node corresponding to the CU includes a reference for each of four nodes that correspond to the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining one or more motion vectors for the PU. A motion vector generally identifies a co-located CU in one or more reference frames, where the term "reference frame" refers a frame that occurs temporally before or after the frame in which the PU is located. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, a prediction direction that identifies whether the identified reference frame is before or after the current frame, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

In addition to having one or more PUs that define one or more motion vectors, a CU may include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure also uses the term "block" to refer to any one or combination of a CU, PU, and/or TU.

In general, encoded video data may include prediction data and residual data. Video encoder 20 may produce the prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a previously coded picture.

Following intra- or inter-prediction, video encoder 20 may calculate residual pixel values for the block. The residual values generally correspond to differences between the predicted pixel value data for the block and the true pixel value data of the block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block.

To further compress the residual value of a block, the residual value may be transformed into a set of transform coefficients that compact as much data (also referred to as "energy") as possible into as few coefficients as possible. Transform techniques may comprise a discrete cosine transform (DCT) process or conceptually similar process, integer transforms, wavelet transforms, or other types of transforms. The transform converts the residual values of the pixels from the spatial domain to a transform domain. The transform coefficients correspond to a two-dimensional matrix of coefficients that is ordinarily the same size as the original block. In other words, there are just as many transform coefficients as pixels in the original block. However, due to the transform, many of the transform coefficients may have values equal to zero.

Video encoder 20 may then quantize the transform coefficients to further compress the video data. Quantization generally involves mapping values within a relatively large range to values in a relatively small range, thus reducing the amount of data needed to represent the quantized transform coefficients. More specifically, quantization may be applied according to a quantization parameter (QP), which may be defined at the LCU level. Accordingly, the same level of quantization may be applied to all transform coefficients in the TUs associated with different PUs of CUs within an LCU. However, rather than signal the QP itself, a change (i.e., a delta) in the QP may be signaled with the LCU. The delta QP defines a change in the quantization parameter for the LCU relative to some reference QP, such as the QP of a previously communicated LCU.

Following quantization, video encoder 20 may scan the transform coefficients, producing a one-dimensional vector from the two-dimensional matrix including the quantized transform coefficients. Video encoder 20 may then perform statistical lossless encoding (which is commonly referred to by the misnomer "entropy encoding") to encode the resulting array to even further compress the data. In general, entropy coding comprises one or more processes that collectively compress a sequence of quantized transform coefficients and/or other syntax information. For example, syntax elements, such as the delta QPs, prediction vectors, coding modes, filters, offsets, or other information, may also be included in the entropy coded bitstream. The scanned coefficients are then entropy coded along with any syntax information, e.g., via content adaptive variable length coding (CAVLC), context adaptive binary arithmetic coding (CABAC), or any other statistical lossless coding process.

Video encoder 20 may then reconstruct the previously encoded video data, decoding this video data and storing the video data to a memory (which may alternatively be referred to as a "reference frame store") for use as a reference when performing motion estimation and compensation. In order to reconstruct this video data, video encoder 20 may perform inverse quantization on the quantized transform coefficients to output transform coefficients, which are then transformed from the frequency domain to the spatial domain to form reconstructed residual video data. Video encoder 20 then adds the reconstructed residual video data to the previously identified reference block to form a reconstructed block of video data. In some instances, video encoder 20 may filter the reconstructed block of video data to remove discontinuities that result due to the sub-division of video data into partitions (which may refer slices, partitions, treeblocks, LCUs and/or CUs as used in HEVC, as one example).

To illustrate, video encoder 20 may apply three filters in a cascaded fashion, whereby video encoder 20 applies a first de-blocking (DB) filter to the reconstructed block of video data, followed by a sample adaptive offset (SAO) filter to the output resulting from applying the DB filter and then followed by an adaptive loop filter (ALF) to the output resulting from applying the SAO filter. Typically, video encoder 20 applies these filters across the boundary separating reconstructed blocks of video data so as to smooth or otherwise reduce discontinuities between the two adjacent reconstructed blocks of video data. This boundary may be a virtual boundary (meaning within a single video block dividing two portions of the same video block or a boundary between two video blocks). Additionally, video encoder 20 typically processes blocks in reading order, traversing a frame from top-to-bottom, left-to-right. As a result, video encoder 20 typically does not produce reconstructed blocks adjacent to the bottom boundary of any reconstructed blocks when these adjacent reconstructed blocks may be required for prompt application of the filters. The delay in providing these reconstructed video blocks may lead to delay in application of the filters, requiring video encoder 20 to include a line buffer or other memory structure to buffer the bottom rows of the current reconstructed video block such that the filters may be applied to the bottom portion of the previous block and the top portion of the adjacent reconstructed video block.

Addition of line buffers may, however, greatly increase the cost and power efficiency of video encoder 20. If video encoder 20 is designated for use in a mobile or other power limited device (which may refer to any device powered by a battery or other limited power source), the power profile of video encoder 20 may increase greatly when extensive line buffers are employed, greatly reducing video capabilities of the device. For this reason, video encoder 20 may perform other processes to reduce the delay associated with application of these filters and potentially reduce the size of line buffers. One such process involves video encoder 20 performing a repetitive "padding" process, whereby the pixel values nearest the bottom edge of the current reconstructed block of video data are repeated in place of the actual pixel values of the adjacent reconstructed block of video data. Thus, video encoder 20 may potentially eliminate much of the delay associated with waiting for the adjacent reconstructed block of video data and potentially reduce size of the line buffer. However, this form of repetitive padding may not provide optimal video quality often inserting discontinuities into the reconstructed video data that may not have otherwise appeared had the actual pixel values been used. Video decoder 30 may implement similar filtering processes with respect to reconstructed video blocks that suffer from the same issues.

In accordance with the techniques described in this disclosure, a video coder, which may generally refer to a video encoders and/or a video decoder, may applying these types of filters in a manner that may reduce a size of line buffers or other memory structures required to implement these filters in comparison to conventional implementations of filters while also potentially reducing visual quality issues that occur in conventional implementations of these type of filters. In one aspect, a video coder may apply partial filters at partition boundaries, such as the boundaries of largest coding units (LCUs), rather than full filters, which may reduce the amount of time required to apply these types of filters in a cascading manner (meaning cascaded application of two or more filters where a first one of the filters is applied and a second one of the filters is applied to the result of applying the first filter), while also potentially reducing line buffer size requirements. These filters are partial in that those coefficients (which may also referred to as "taps") of the filter for which pixel values of the video data will not be available for filtering are removed from a selected "full" filter, thereby generating a filter having only a subset or a partial amount of the filter coefficients of the full filter.

In some instances, these partial filters are asymmetric in that the number of filter taps on either side of the filter x-axis and/or y-axis is not equal. In other words, the techniques may provide for filters having a bias along one or both of the x- and/or y-axis that may reduce the number of lines of the adjacent reconstructed video block that are required for application of the filter to the current reconstructed video block. For example, a filter may comprise taps both along the x-axis and along a y-axis of the filter. The techniques may provide for a filter having a positive y-axis bias for the y-axis filter taps, meaning that this filter includes more y-axis taps above the x-axis than below the x-axis. In this sense, the filter is "asymmetric" because the filter does not include the same number of y-axis taps both above and below the x-axis filter row of filter taps. Because the number of taps is reduced below the x-axis, video encoder 20 and/or video decoder 30 may apply the asymmetric filter in such a manner that it may require less or possibly no rows of the reconstructed video block located below (and possibly directly below) the current reconstructed video block. In this sense, the techniques may reduce line buffer size requirements and may even eliminate line buffers used for this purpose altogether, while also reducing coding delay in the sense that, in some instances, video encoder 20 and/or video decoder 30 do not need to wait for the adjacent reconstructed video block.

In other instances, the partial filters are symmetric, where these symmetric partial filters includes the same number of filter taps on either side of the filter x-axis and y-axis, but include less filter taps along the x-axis and/or y-axis than the selected symmetric full filter. These symmetric partial filters may also generally include less filter taps along the y-axis so that the symmetric partial filters may be applied without having to wait for the reconstructed video block located below (and usually directly below) the current reconstructed video block being filtered. Again, because the number of taps is reduced below the x-axis, video encoder 20 and/or video decoder 30 may apply the symmetric partial filter in such a manner that it may require less or possibly no rows of the reconstructed video block located below (and possibly directly below) the current reconstructed video block. In this sense, the techniques may, as noted above, reduce line buffer size requirements and may even eliminate line buffers used for this purpose altogether, while also reducing coding delay in the sense that, in some instances, video encoder 20 and/or video decoder 30 do not need to wait for the adjacent reconstructed video block.

In operation, video encoder 20 and/or video decoder 30 selecting a filter to apply near a boundary of a first block of the video data that separates a first block of the video data from a second block of the video data, where the selected filter comprises a number of filter coefficients (which may also be referred to as "filter taps" or "taps"). Video encoder 20 and/or video decoder 30 may select the filter (meaning, for example, the filter type, size and shape) based on a number of criteria, including subjective quality enhancement or minimizing errors between original frame and recontructed frame (i.e., Wiener filter based), as one example.

After selecting a filter, video encoder 20 and/or video decoder 30 may determine at least one of the filter coefficients for which the video data will not be available to be filtered. For example, video encoder 20 and/or video decoder 30 may determine which of the filter coefficients that may not be available due to application of another filter or because the second block adjacent to the current first block has not yet been reconstructed. Based on the determination of the at least one of the filter coefficients for which the video data will not be available to be filtered, video encode 20 and/or video decoder 30 may determine a partial filter such that this partial filter includes one or more of the at least one of the plurality of filter coefficients for which the video data will be available to be filtered. In other words, video encoder 20 and/or video decoder 30 may remove the at least one of the filter coefficients specified for the selected filter for which video data will not be available for filtering. In some instances, video encoder 20 and/or video decoder 30 may remove one or more of the filter coefficients specified for the selected filter for which video data will be available for filtering, e.g., to generate a symmetric filter as described in more detail below.

Normally, filter coefficients for the selected filter sum to one (meaning the filters coefficients are normalized) so as not to add or remove video data through application of the filter. By removing filter coefficients of the selected filter in order to determine the partial filter (which is termed a "partial" filter again due to the removal of the one or more filter coefficients from the originally selected filter), the resulting partial filter becomes un-normalized (meaning the filter coefficients of the partial filter do not sum to one). As a result, video encoder 20 and/or video decoder 30 may renormalize the plurality of filter coefficients included within the partial filter. Video encoder 20 and/or video decoder 30 may then apply the renormalized partial filter near the boundary of the first block of the video data to generate a filtered first block of the video data. Video encoder 20 and/or video decoder 30 may store this filtered first block of the video data for use as reference video data in reconstructing other blocks of the video data.

Additionally, video encoder 20 and/or video decoder 30 may perform a form of padding referred to as "mirrored padding" when applying these or other filters, which may provide for better visual quality of the decoded video data by avoiding discontinuities introduced at boundaries of partitions that may result in conventional application of adaptive loop filters at boundaries of partitions modified using repetitive padding of pixels. Mirror padding may refer to a process whereby video encoder 20 and/or video decoder 30 mirrors pixel values near a current boundary of a block in place of, i.e., to take the place of, actual pixel values so that video encoder 20 and/or video decoder 30 may apply one or more of the above noted filters without having to wait for the actual pixel values. The mirror padding aspects of the techniques described in this disclosure may reduce the size of, or even possibly eliminate, line buffers while also promoting improved video quality in comparison to repetitive or other forms of padding, as described in more detail below.

Figure 2:
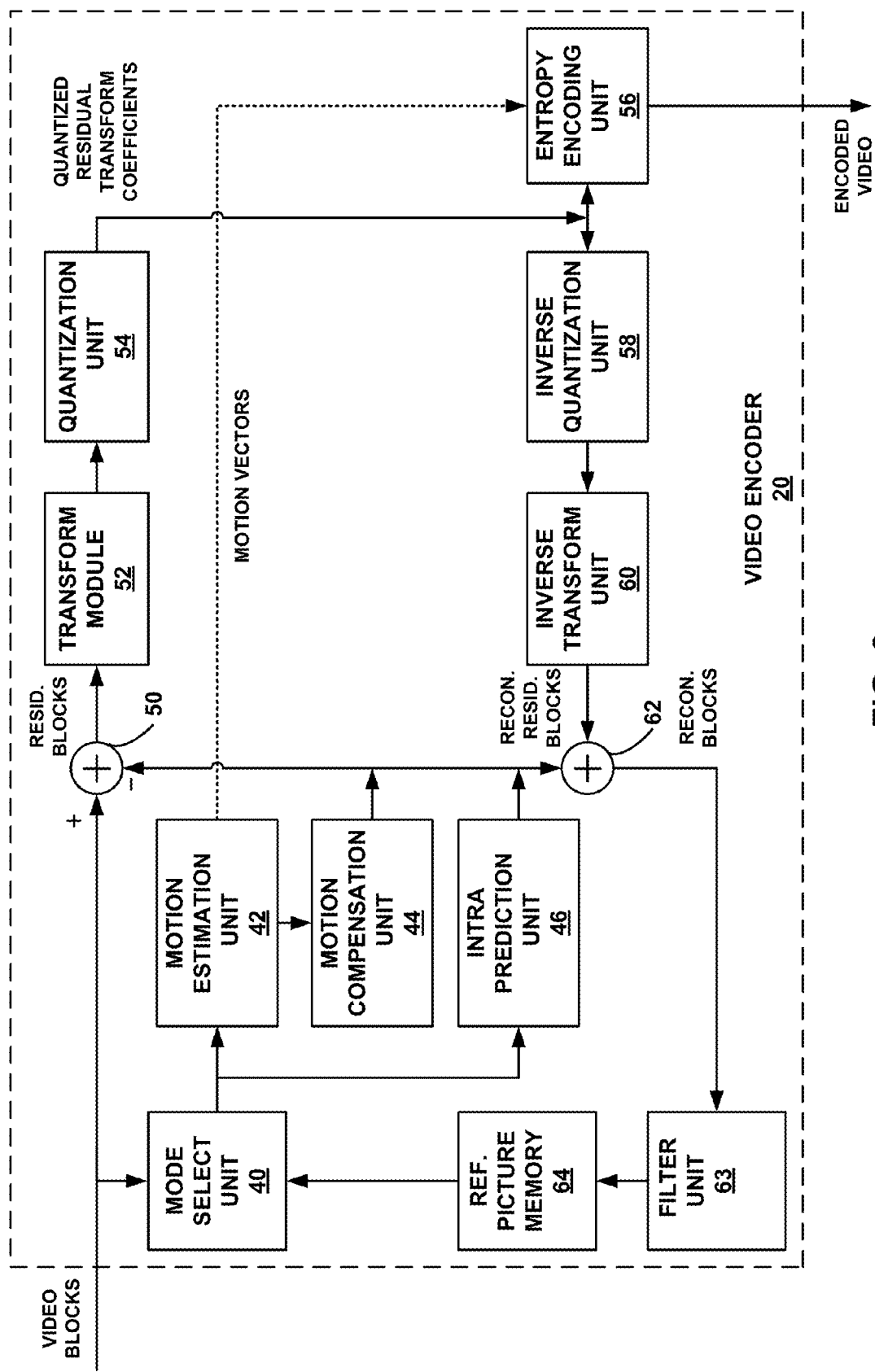
FIG. 2 is a block diagram illustrating an example the video encoder shown in the example of FIG. 1 that may implement the partition-based filter techniques described in this disclosure.

FIG. 2 is a block diagram illustrating an example video encoder 20 that may implement the partition-based filter techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, motion estimation unit 42, motion compensation unit 44, intra prediction unit 46, reference picture memory 64, summer 50, transform module 52, quantization unit 54, and entropy encoding unit 56. For video block reconstruction, video encoder 20 also includes inverse quantization unit 58, inverse transform unit 60, and summer 62. A filter unit 63 is also included to filter block boundaries to remove blockiness artifacts from reconstructed video, where the phrase "blockiness artifacts" refers to artifacts in reconstructed video data that occur due to the partitioning of pictures or video frames into blocks, such as LCUs and CUs.

As shown in FIG. 2, video encoder 20 receives a current video block within a video slice to be encoded. The slice may be divided into multiple video blocks, i.e., the treeblocks described in HEVC, as one example. Mode select unit 40 may select one of the coding modes, intra or inter, for the current video block based on error results. If the intra or inter modes are selected, mode selection unit 40 provides the resulting intra- or inter-coded block to summer 50 to generate residual block data and to summer 62 to reconstruct the encoded block for use as a reference picture. Intra prediction unit 46 performs intra-predictive coding of the current video block relative to one or more neighboring blocks in the same frame or slice as the current block to be coded to provide spatial compression. Motion estimation unit 42 and motion compensation unit 44 perform inter-predictive coding of the current video block relative to one or more predictive blocks in one or more reference pictures to provide temporal compression.

In the case of inter-coding, motion estimation unit 42 may be configured to determine the inter-prediction mode for a video slice according to a predetermined pattern for a video sequence. The predetermined pattern may designate video slices in the sequence as P slices, B slices or generalized P/B (GPB) slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

An inter-predictive block is a block, in a reference picture, that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Alternatively, video encoder 20 may perform a process referred to as intra-prediction, whereby the video encoder 20 uses spatially neighboring blocks to predict a current block. Intra-prediction may be performed for I-frames and limited to slices so that individual slices may be reconstructed without reference to other temporally proximate frames. In some instances, two or more spatially neighboring blocks may form the reference block for the current block. Intra-prediction may be performed to generate a predictive block for hte current block similar to inter-prediction.

In any event, after motion compensation unit 44 generates the predictive block for the current video block, video encoder 20 forms a residual video block by subtracting, using summer 50, the predictive block from the current video block. The residual video data in the residual block may be included in a so-called "coding node" of a CU and passed to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain. Transform module 52 may store information concerning the type of each transform and potentially coefficients of the each transform applied to the residual video data in a TU associated with the CU, along with any other transform-related information.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 performs a form of statistical lossless encoding (which may be referred to as "entropy encoding") to encode the quantized transform coefficients. For example, entropy encoding unit 56 may perform context adaptive variable length coding (CAVLC), context adaptive binary arithmetic coding (CABAC), or another entropy encoding technique. Following entropy encoding, entropy encoding unit 56 may transmit the encoded bitstream to video decoder 30, or archive the encoded bitstream for later transmission to or retrieval by video decoder 30. Entropy encoding unit 56 may also entropy encode the motion vectors and the other syntax elements for the current video slice being coded.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block is filtered by filter unit 63 in order to remove blockiness artifacts. The reference block is then stored in reference picture memory 64. The reference block may be used by motion estimation unit 42 and motion compensation unit 44 as a reference block to inter-predict a block in a subsequent video frame or picture.

Filter unit 63 may represent a module that applies one or more of the partition-based filters in accordance with the techniques described in this disclosure. In this respect, filter unit 63 may select a full filter to apply near a boundary of a video block that separates a first block of the video data from a second block of the video data, where the selected filter comprises a number of filter coefficients (which, again, may also be referred to as "filter taps" or "taps"). Filter unit 63 may select the filter based on a number of criteria, including those described above. The selected full filter may comprise one or more of a DB filter, an SOA filter, an ALF or any other type of filter normally applied to reconstructed video blocks to potentially improve perceived visual quality.

After selecting the full filter, filter unit 63 may determine at least one of the filter coefficients of the full filter for which the video data will not be available to be filtered. This process of determining the at least one of the filter coefficients of the full filter for which the video data will be unavailable to be filtered is described below in more detail with respect to the example of FIGS. 4A-4E. Based on the determination of the at least one of the filter coefficients for which the video data will not be available to be filtered, filter unit 30 may determine a partial filter such that this partial filter includes one or more of those of the plurality of filter coefficients for which the content data will be available to be filtered. In other words, filter unit 63 may remove the at least one of the filter coefficients specified for the selected full filter for which video data will not be available for filtering. Filter unit 63 may then renormalize the plurality of filter coefficients included within the partial filter so that these remaining filter coefficients once again sum to one. Filter unit 63 may then apply the renormalized partial filter near the boundary of the first block of the video data to generate a filtered first block of the video data. Filter unit 63 may store this filtered first block of the video data for use as reference sample in reconstructing other portions of the video data. Filter unit 63 may also store filter coefficients for the selected full filter with the filtered first block of the video data so that these filter coefficients may be sent to a decoder, such as video decoder 30, where video decoder 30 may perform a similar process to that described above to derive the filter coefficients for the renormalized partial filter.

Either in addition to applying one or more partial filters or separately when applying other types of filters (such as full filters and the like), filter unit 63 may also perform a form of padding referred to as "mirrored padding" when applying these filters, which may provide for better visual quality of the decoded video data by avoiding discontinuities introduced at boundaries of partitions that may result in conventional application of filters at boundaries of blocks modified using repetitive padding of pixels. Mirror padding may refer to a process whereby filter unit 63 mirrors pixel values near a current boundary of a partition in place of actual pixel values so that filter unit 63 may apply one or more of the above noted filters without having to wait for the actual pixel values. As noted above, the mirror padding aspects of the techniques described in this disclosure may reduce the size of, or even possibly eliminate, line buffers while also promoting improved video quality in comparison to repetitive or other forms of padding, as described in more detail below. Mirror padding is described in more detail below with respect to FIGS. 5A, 5B.

Filter unit 63 may implement one or more aspects of the techniques repeatedly with respect to cascaded application of different types of filters. For example, filter unit 63 may first apply these techniques when applying a DB filter to a block of video data, such as an LCU. Filter unit 63 may, as one example, adapt a symmetrical full DB filter in the manner described above so as to generate a asymmetric or symmetric partial DB filter, renormalize this asymmetric or symmetric partial DB filter and apply the renormalized asymmetric or symmetric partial DB filter to the pixel values of the lower boundary (as one example) of the LCU. Filter unit 63 may then adapt a symmetrical full SAO filter in the manner described above so as to generate an asymmetric or symmetric partial SAO filter, renormalize this asymmetric or symmetric partial SAO filter and apply the renormalized asymmetric or symmetric partial SAO filter to the DB filtered pixel values of the lower boundary (as one example) of the LCU. Filter unit 63 may also adapt a symmetrical full ALF in the manner described above so as to generate an asymmetric or symmetric partial ALF, renormalize this asymmetric or symmetric partial ALF and apply the renormalized asymmetric or symmetric partial ALF to the DB and SAO filtered pixel values of the lower boundary (as one example) of the LCU.

In some instances, filter unit 63 may perform mirror padding with respect to cascaded application of each of the symmetric full DB, SAO and AL filters. Alternatively, filter unit 63 may perform mirror padding with respect to cascaded application of some symmetric full DB, SAO and AL filters and some renormalized asymmetric or symmetric partial DB, SAO and AL filters, where the renormalized asymmetric or symmetric partial DB, SAO and AL filters may be generated in a manner consistent with the techniques described in this disclosure. In other words, the techniques may be implemented by a video coder (which again may generally refer to one or more of a video encoder and a video decoder) in any combination such that mirror padding may be performed in conjunction with or as an alternative to the application of asymmetric partial filters.

Figure 3:
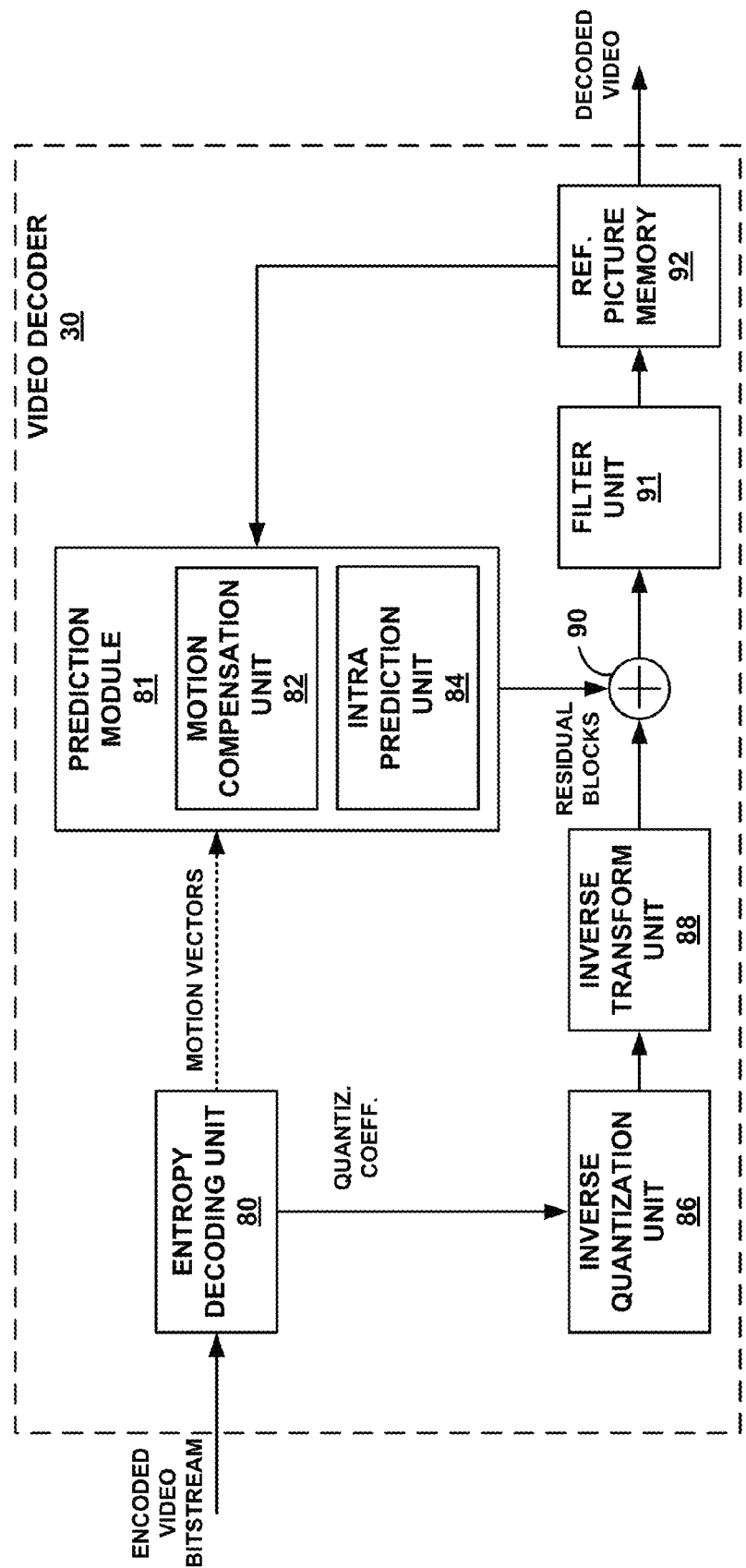
FIG. 3 is a block diagram illustrating an example of the video decoder shown in the example of FIG. 1 that may implement the partition-based filtering techniques described in this disclosure.

FIG. 3 is a block diagram illustrating an example of video decoder 30 in more detail that may implement the partition-based filtering techniques described in this disclosure. In the example of FIG. 3, video decoder 30 includes an entropy decoding unit 80, a prediction module 81, an inverse quantization unit 86, an inverse transformation unit 88, a summer 90, a de-blocking filter 91, and a reference picture memory 92 (which may also be referred to as a decoded picture buffer). Prediction module 81 includes motion compensation unit 82 and intra prediction unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video slice level and/or the video block level.

When the video slice is coded as an intra-coded (I) slice, intra prediction unit 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. Motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. A filter unit 91 is applied to filter the decoded blocks in order to remove blockiness artifacts. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Filter unit 91 may represent a module that applies one or more of the partition-based filters in accordance with the techniques described in this disclosure. In this respect, filter unit 91 may select a full filter to apply near a boundary of a video block that separates a first block of the video data from a second block of the video data, where the selected filter comprises a number of filter coefficients (which, again, may also be referred to as "filter taps" or "taps"). Filter unit 91 may determine the filter from coded filter coefficients included in the encoded bitstream, which are then decoded to form decoded filter coefficients. Commonly, filter unit 91 may receive filter coefficients of the full filter selected by, as one example, filter unit 63 of video encoder 20 and then derive the filter coefficients from the selected full filter coefficients in a manner similar to that described above with respect to video encoder 20 shown in the example of FIG. 2. The selected full filter may comprise one or more of a DB filter, an SOA filter, an ALF or any other type of filter normally applied to reconstructed video blocks to potentially improve perceived visual quality.

After selecting the full filter, filter unit 91 may determine at least one of the filter coefficients of the full filter for which the video data will not be available to be filtered. This process of determining the at least one of the filter coefficients of the full filter for which the video data will be unavailable to be filtered is described below in more detail with respect to the example of FIGS. 4A-4E. Based on the determination of the at least one of the filter coefficients for which the video data will not be available to be filtered, filter unit 30 may determine a partial filter such that this partial filter includes one or more of those of the plurality of filter coefficients for which the content data will be available to be filtered. In other words, filter unit 91 may remove the at least one of the filter coefficients specified for the selected full filter for which video data will not be available for filtering. Filter unit 91 may then renormalize the plurality of filter coefficients included within the partial filter so that these remaining filter coefficients once again sum to one. Filter unit 91 may then apply the renormalized partial filter near the boundary of the first block of the video data to generate a filtered first block of the video data. Filter unit 91 may store this filtered first block of the video data for use as reference sample in reconstructing other portions of the video data.

Either in addition to applying one or more partial filters or separately when applying other types of filters (such as full filters and the like), filter unit 91 may also perform a form of padding referred to as "mirrored padding" when applying these filters, which may provide for better visual quality of the decoded video data by avoiding discontinuities introduced at boundaries of partitions that may result in conventional application of filters at boundaries of blocks modified using repetitive padding of pixels. Mirror padding may refer to a process whereby filter unit 91 mirrors pixel values near a current boundary of a partition in place of actual pixel values so that filter unit 91 may apply one or more of the above noted filters without having to wait for the actual pixel values. As noted above, the mirror padding aspects of the techniques described in this disclosure may reduce the size of, or even possibly eliminate, line buffers while also promoting improved video quality in comparison to repetitive or other forms of padding, as described in more detail below. Mirror padding is described in more detail below with respect to FIGS. 5A, 5B.

Filter unit 91 may implement one or more aspects of the techniques repeatedly with respect to cascaded application of different types of filters. For example, filter unit 91 may first apply these techniques when applying a DB filter to a block of video data, such as an LCU. Filter unit 91 may, as one example, adapt a symmetrical full DB filter in the manner described above so as to generate a asymmetric or symmetric partial DB filter, renormalize this asymmetric or symmetric partial DB filter and apply the renormalized asymmetric or symmetric partial DB filter to the pixel values of the lower boundary (as one example) of the LCU. In this example, filter unit 91 may then adapt a symmetrical full SAO filter in the manner described above so as to generate an asymmetric or symmetric partial SAO filter, renormalize this asymmetric or symmetric partial SAO filter and apply the renormalized asymmetric or symmetric partial SAO filter to the DB filtered pixel values of the lower boundary (as one example) of the LCU. Filter unit 91 may also adapt a symmetrical full ALF in the manner described above so as to generate an asymmetric or symmetric partial ALF, renormalize this asymmetric or symmetric partial ALF and apply the renormalized asymmetric or symmetric partial ALF to the DB and SAO filtered pixel values of the lower boundary (as one example) of the LCU.

In some instances, filter unit 91 may perform mirror padding with respect to cascaded application of each of the symmetric full DB, SAO and AL filters. Alternatively, filter unit 91 may perform mirror padding with respect to cascaded application of some symmetric full DB, SAO and AL filters and some renormalized asymmetric or symmetric partial DB, SAO and AL filters, where the renormalized asymmetric or symmetric partial DB, SAO and AL filters may be generated in a manner consistent with the techniques described in this disclosure. In other words, the techniques may be implemented by a video coder (which again may generally refer to one or more of a video encoder and a video decoder) in any combination such that mirror padding may be performed in conjunction with or as an alternative to the application of asymmetric partial filters.

Figure 4A:
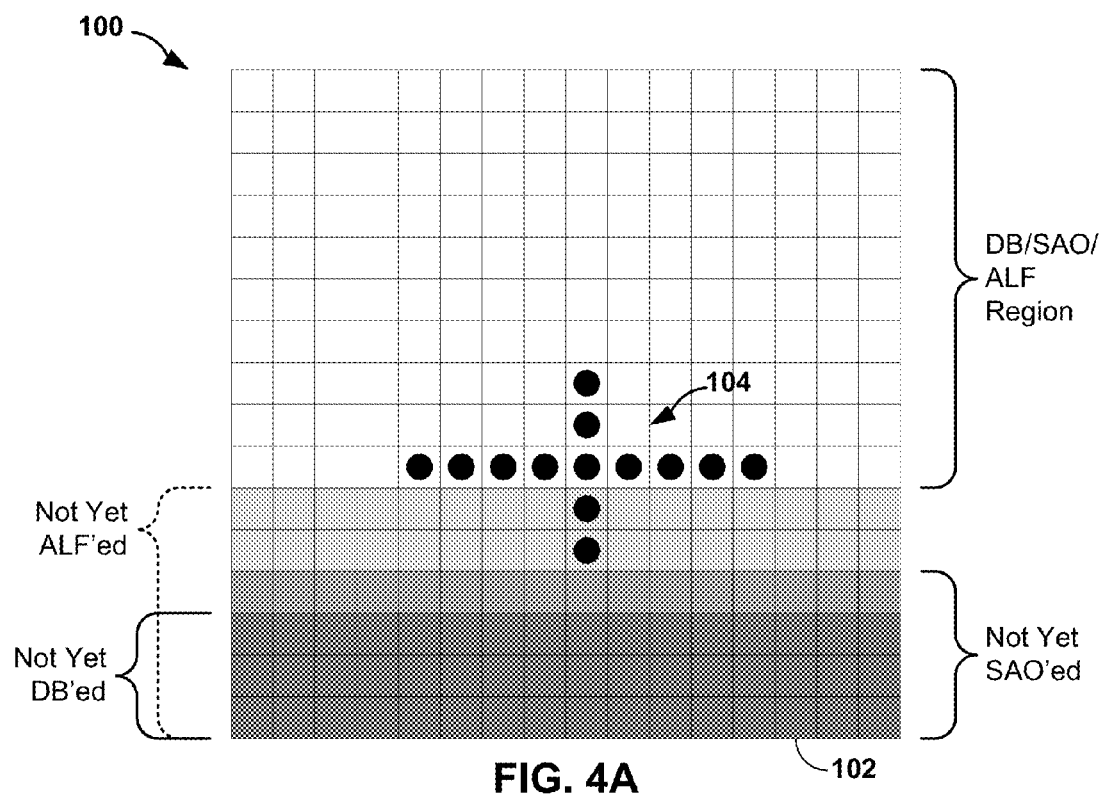
FIGS. 4A-4E are diagrams illustrating an exemplary block of video data that is filtered in accordance with the partial filtering aspects of the techniques described in this disclosure.

FIGS. 4A-4E are diagrams illustrating an exemplary block of video data 100 that is filtered in accordance with the partial filtering aspects of the techniques described in this disclosure. FIG. 4A is a diagram showing block of video data 100, where a filter unit of a video encoder and/or video decoder, such as filter unit 63 of video encoder 20 shown in the example of FIG. 2 and/or filter unit 91 of video decoder 30 shown in the example of FIG. 3, may initially apply in a cascaded manner, a DB filter, a SAO filter and an ALF. While described with respect to filter unit 63 below, the techniques may be implemented in a similar fashion by filter unit 91. Moreover, while described with respect to particular video encoders and/or video decoders, the techniques may generally be implemented by any video coding device or other content coding unit or device.

As shown in the example of FIG. 4A, block of video data 100 (which may also be referred to as "video block 100") comprises a 16x16 block of pixel values, where each square shown in the example of filter unit 63 represents data defining a single pixel value. Video block 100 may represent a reconstructed video block and may, therefore, additionally be referred to as "reconstructed video block 100." As further noted in the example of FIG. 4A, filter unit 63 applies a DB filter to the top 13 rows of video block 100, a SAO filter to the top 12 rows of video block 100 and an ALF to the top 10 rows of video block 100. Filter unit 63 has not applied DB filter to the bottom 3 rows because the DB filter requires pixel values from the lower adjacent block of video data. Block 100 may be separated from this lower adjacent block by boundary 102, which refers to the bottom line of video block 100. Because the filters are applied in a cascaded fashion, with the result of applying one filter being further filtered by another filter in the line, filter unit 63 cannot apply SAO filter to the bottom four rows of block 100 because filter unit 63 requires the result of applying the DB filter to the bottom three rows. Likewise, filter unit 63 cannot apply the ALF to the bottom six rows because filter unit 63 requires the result of applying the SAO filter to the bottom four rows.

The ALF is shown in the example of FIG. 4A as ALF 104. While the following discussion of FIGS. 4B-4E focuses on ALF 104, the techniques may be applied with respect to each of the DB filter and SAO filter, as well as, to any other application of cascaded filters. ALF 104 may represent a full ALF in that it has not been modified to remove any filter coefficients, which are shown in the example of FIG. 4A as block dots. For this reason, ALF filter may be referred to as "full ALF 104." Full ALF 104 is also symmetric in that the number of taps or coefficients on each of the x-axis and y-axis are the same. Full ALF 104 includes two coefficients above and below the x-axis and four coefficients to the right and left of the y-axis. Consequently, ALF 104 may be referred to as "symmetric ALF 104" or "symmetric full ALF 104." It is assumed that filter unit 63 selected symmetric full ALF 104 and has applied symmetric full ALF 104 to the top 10 rows of video block 100.

Figure 4B:
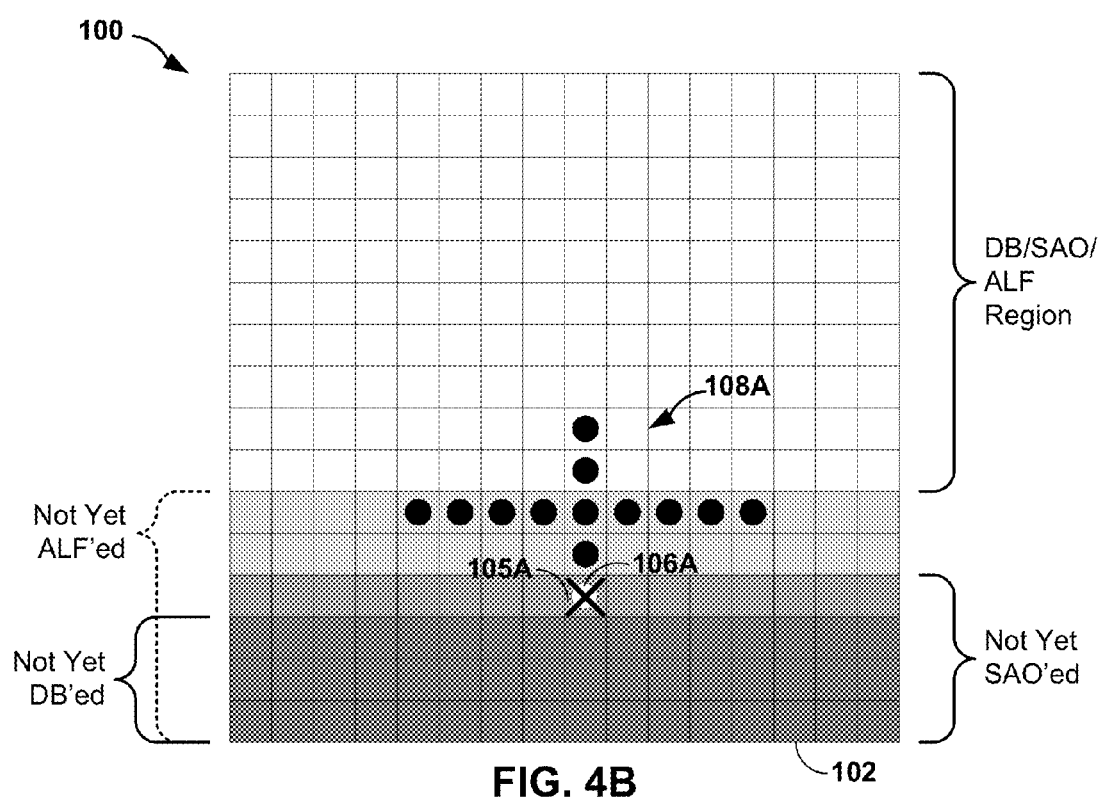

Referring next to the example of FIG. 4B, filter unit 63 may, when applying ALF 104, determine that pixel value 105A is not available to be filtered (denoted by the "X" in the example of FIG. 4B), even though ALF 104 includes filter coefficient 106A to filter pixel value 105A. As a result, filter unit 63 removes filter coefficient 106A (as denoted by the dashed lined white dot) to generate asymmetric partial filter 108A, which is then renormalized in the manner described in this disclosure. Asymmetric partial filter 108A may be "asymmetric" in the sense that filter 108A includes one coefficient below the x-axis and two coefficients above the x-axis. Moreover, asymmetric partial filter 108A may be "partial" in the sense that filter 108A does not include every coefficient included within full filter 104. However, filter unit 63 may apply asymmetric partial filter 108A to the sixth row from boundary 102 of video block 100 when filter unit 63 would otherwise not be able to apply full filter 104. As a result, the techniques described in this disclosure may improve the speed with which filtering may be performed in comparison to conventional filtering techniques. Moreover, the techniques may reduce the size of (if not eliminate the need for) line buffers in that no additional memory is required to store blocks of video data for the purpose of waiting for adjacent video blocks to be reconstructed and subsequently filtered.

Figure 4C:
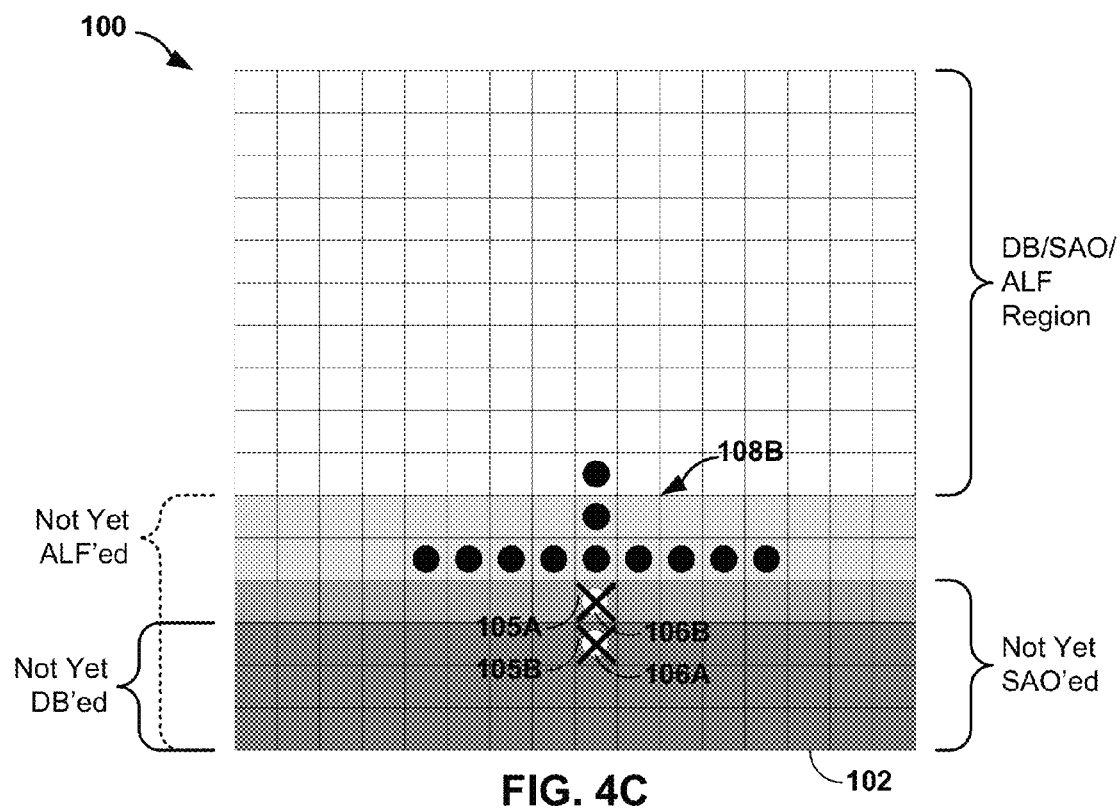

Referring next to the example of FIG. 4C, filter unit 63 may, when applying ALF 104, determine that pixel values 105A and 105B are not available to be filtered (denoted by the "X's" in the example of FIG. 4B), even though ALF 104 includes filter coefficients 106A to filter pixel value 105B and filter coefficient 106B to filter pixel value 105A. As a result, filter unit 63 removes filter coefficients 106A, 106B (as denoted by the dashed lined white dot) to generate asymmetric partial filter 108B, which may be renormalized in the manner described in this disclosure. Asymmetric partial filter 108B may be "asymmetric" in the sense that filter 108B includes no coefficients below the x-axis and two coefficients above the x-axis. Moreover, asymmetric partial filter 108B may be "partial" in the sense that filter 108B does not include every coefficient included within full filter 104. However, filter unit 63 may apply asymmetric partial filter 108B to the fifth row from boundary 102 of video block 100 when filter unit 63 would otherwise not be able to apply full filter 104. As a result, the techniques described in this disclosure may again improve the speed with which filtering may be performed in comparison to conventional filtering techniques. Again, the techniques may reduce the size of (if not eliminate the need for) line buffers in that no additional memory is required to store blocks of video data for the purpose of waiting for adjacent video blocks to be reconstructed and subsequently filtered.

Figure 4D:
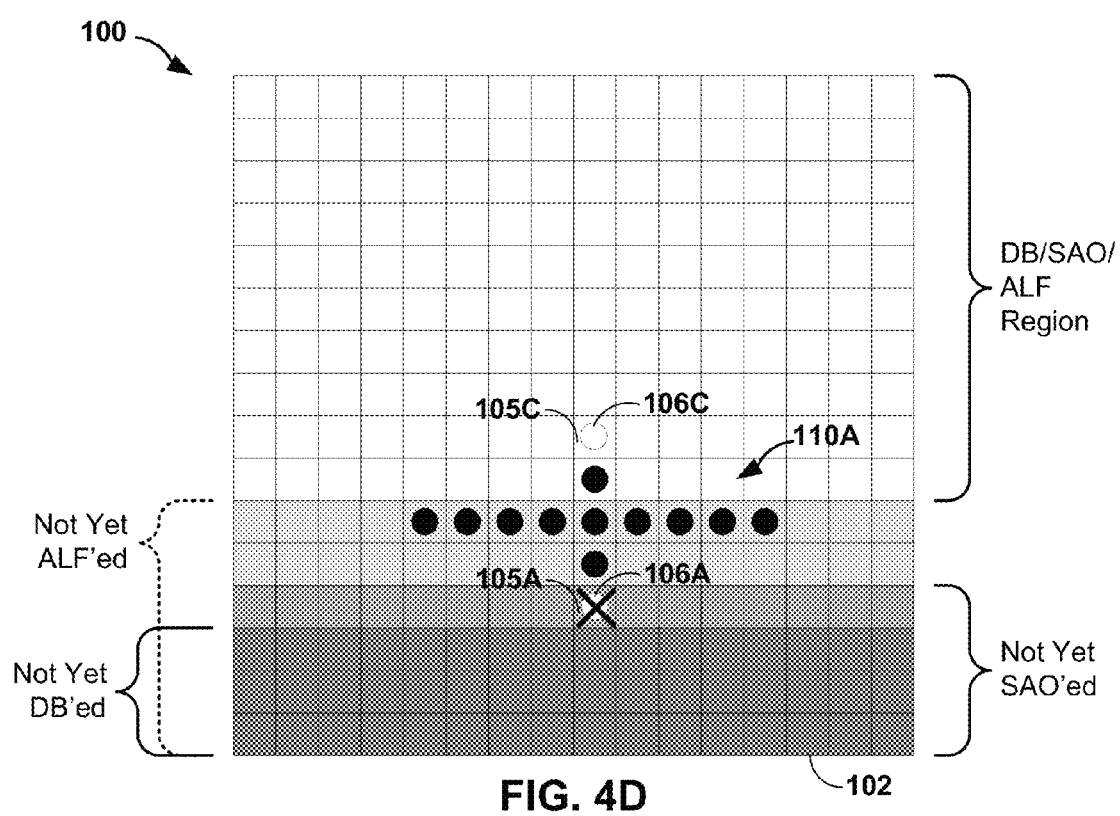
Figure 4E:
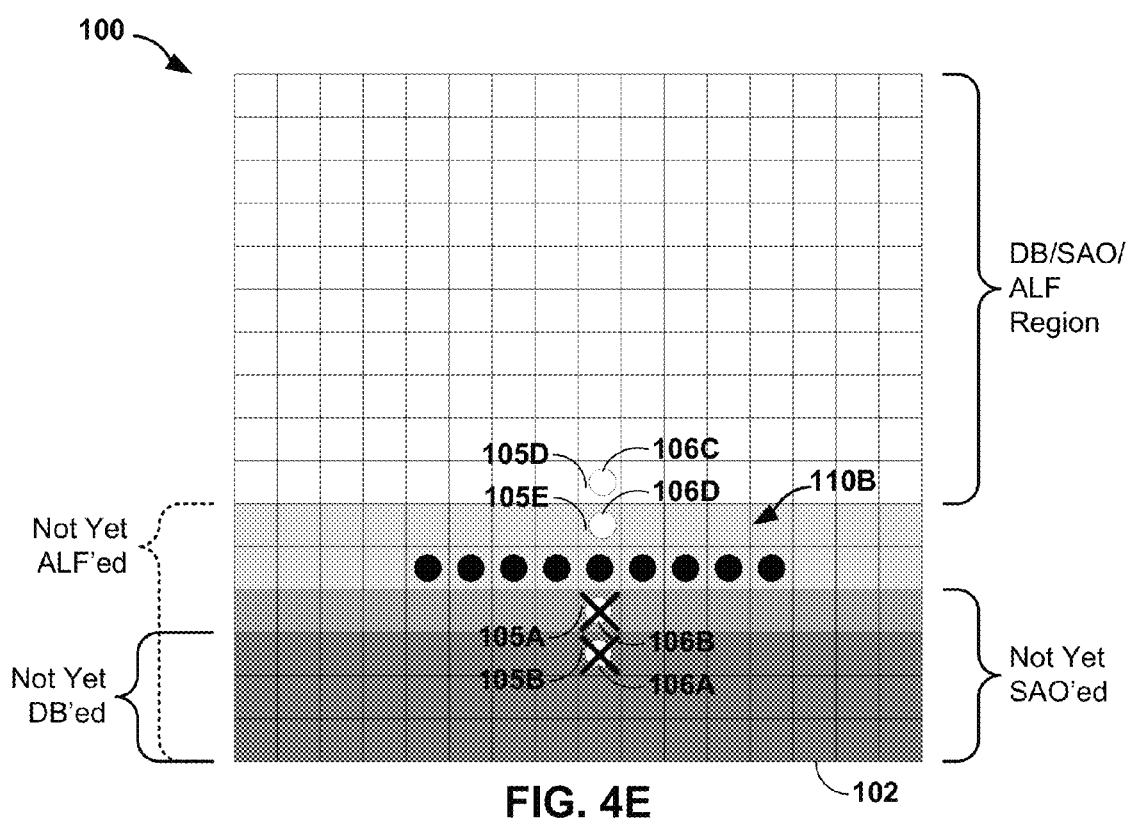

FIGS. 4D and 4E illustrate an alternative way by which the techniques may be implemented with respect to video block 100 using symmetric filters 110A and 110B generated or derived from the same full ALF 104 shown in the example of FIG. 4A. While described as an alternative for purposes of ease of explanations, filter unit 63 may select asymmetric or symmetric filters on a per pixel value basis, utilizing one of asymmetric filters 108A, 108B or symmetric filters 110A, 110B to filter any one of the pixel values in the sixth or lower rows from the boundary 102 of video block 100. In this respect, filter unit 63 may adaptively apply filters 108A, 108B, 110A and 110B on a pixel value-by-pixel value basis in a partition-based manner (meaning at a LCU or partition-level rather than a slice or frame level).

For example, when applying partial filters, whether symmetric or asymmetric, to lines above the fourth line from the bottom of boundary 102 (where this fourth line boundary may be referred to as a virtual boundary), filter unit 63 may always apply a partial ALF for lines above this virtual boundary (i.e., the fifth and sixth lines from boundary 102 in these examples). In some instances, filter unit 63 may only apply a partial ALF for the sixth line from boundary 102 and not apply any ALF to the fifth line from boundary 102 (meaning that the result of applying SAO filter is stored). In other instances, filter unit 63 may determine whether to use partial filters based on some criteria, such as whether a number of coefficients of full ALF 104 having pixel values that are unavailable exceed a first threshold number, whether a sum of these coefficients having pixel values that are unavailable exceeds a second threshold value and/or whether a sum of the absolute value of these coefficients having pixel values that are unavailable exceeds a third threshold value.

In the example of FIG. 4D, filter unit 63 may, when applying ALF 104, determine that pixel value 105A is not available to be filtered (denoted by the "X" in the example of FIG. 4B), even though ALF 104 includes filter coefficient 106A to filter pixel value 105A. As a result, filter unit 63 removes filter coefficient 106A (as denoted by the dashed lined white dot) while also removing filter coefficient 106C to preserve symmetry even though filter coefficient 106C includes an available pixel value 105C. Filter unit 63 thereby generates symmetric partial filter 110A, which is symmetric in the sense that filter 110A includes a single filter coefficient both above and below the x-axis and partial in the sense that coefficients 106A and 106C are removed from full ALF 104. However, filter unit 63 may apply symmetric partial filter 110A to the sixth row from boundary 102 of video block 100 when filter unit 63 would otherwise not be able to apply full filter 104 and thereby potentially provide the speed and line buffer benefits described above.

Referring next to the example of FIG. 4E, filter unit 63 may, when applying ALF 104, determine that pixel values 105A and 105B are not available to be filtered (denoted by the "X's" in the example of FIG. 4B), even though ALF 104 includes filter coefficients 106A to filter pixel value 105B and filter coefficient 106B to filter pixel value 105A. As a result, filter unit 63 removes filter coefficients 106A, 106B (as denoted by the dashed lined white dot) and filter coefficients 106C and 106D to preserve symmetry (even though these filter coefficients are applied to available pixel values 105D, 105E) and thereby generate symmetric partial filter 110B, which may be renormalized in the manner described in this disclosure. Symmetric partial filter 110B may be "symmetric" in the sense that filter 110B includes the same number of coefficients both below and above the x-axis (i.e., no filter coefficients both above and below the x-axis in the example of FIG. 4E). Moreover, symmetric partial filter 110B may be "partial" in the sense that filter 110B does not include every coefficient included within full filter 104. However, filter unit 63 may apply symmetric partial filter 110B to the fifth row from boundary 102 of video block 100 when filter unit 63 would otherwise not be able to apply full filter 104 and thereby potentially provide the speed and line buffer benefits described above.

Figure 5A:
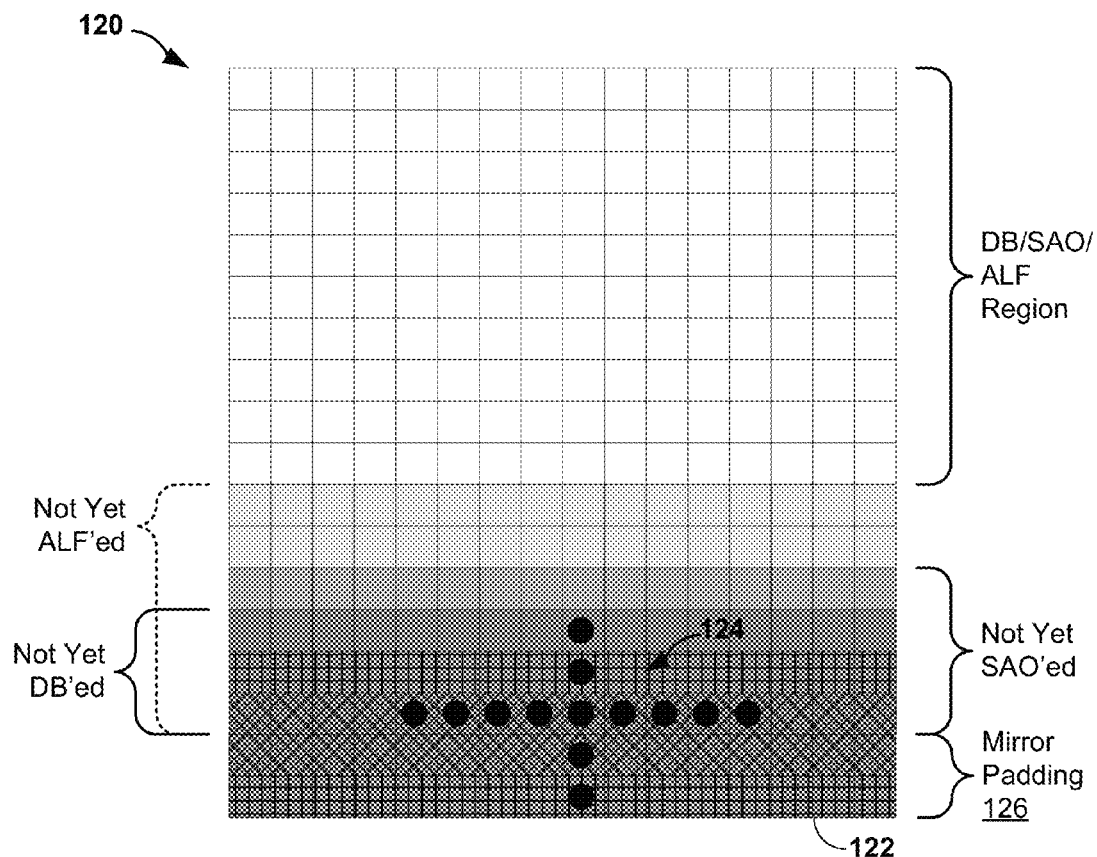
FIGS. 5A-5B are diagrams illustrating exemplary block of video data that is filtered in accordance with the mirror padding aspects of the techniques described in this disclosure.
Figure 5B:
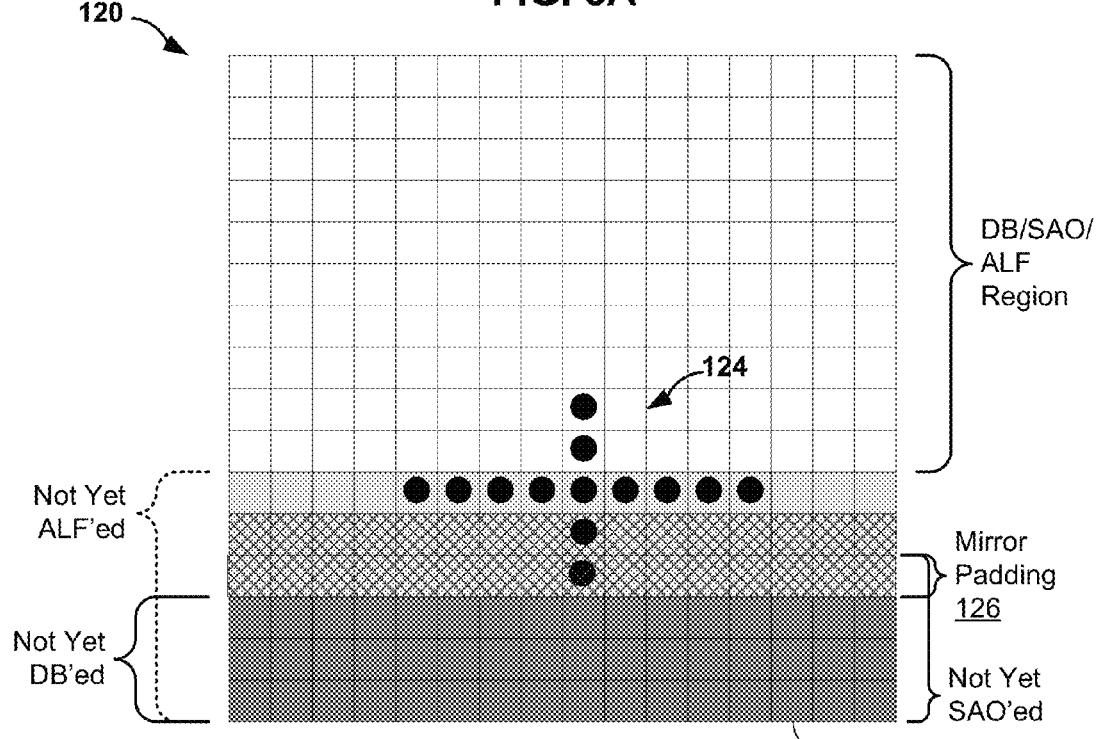

FIGS. 5A-5B are diagrams illustrating exemplary block of video data 120 that is filtered in accordance with the mirror padding aspects of the techniques described in this disclosure. FIG. 5A is a diagram showing block of video data 120, where a filter unit of a video encoder and/or video decoder, such as filter unit 63 of video encoder 20 shown in the example of FIG. 2 and/or filter unit 91 of video decoder 30 shown in the example of FIG. 3, may initially apply in a cascaded manner, a DB filter, a SAO filter and an ALF. While described with respect to filter unit 63 below, the techniques may be implemented in a similar fashion by filter unit 91. Moreover, while described with respect to particular video encoders and/or video decoders, the techniques may generally be implemented by any video coding device or other content coding unit or device.

As shown in the example of FIG. 5A, block of video data 120 (which may also be referred to as "video block 120") comprises, like video block 100 shown in the examples of FIGS. 4A-4E, a 16×16 block of pixel values, where each square shown in the example of filter unit 63 represents data defining a single pixel value. Video block 120 may represent a reconstructed video block and may, therefore, additionally be referred to as "reconstructed video block 120." As further noted in the example of FIG. 5A, filter unit 63 applies a DB filter to the top 13 rows of video block 120, a SAO filter to the top 12 rows of video block 120 and an ALF to the top 10 rows of video block 120. Filter unit 63 has not applied DB filter to the bottom 3 rows because the DB filter requires pixel values from the lower adjacent block of video data. Block 120 may be separated from this lower adjacent block by boundary 122, which refers to the bottom line of video block 120. Because the filters are applied in a cascaded fashion, with the result of applying one filter being further filtered by another filter in the line, filter unit 63 cannot apply SAO filter to the bottom four rows of block 120 because filter unit 63 requires the result of applying the DB filter to the bottom three rows. Likewise, filter unit 63 cannot apply the ALF to the bottom six rows because filter unit 63 requires the result of applying the SAO filter to the bottom four rows.

The ALF is shown in the example of FIG. 5A as ALF 124. While the following discussion of FIG. 5B focuses on ALF 124, the techniques may be applied with respect to each of the DB filter and SAO filter, as well as, to any other application of cascaded filters. ALF 124 may represent a full ALF in that it has not been modified to remove any filter coefficients, which are shown in the example of FIG. 5A as block dots. For this reason, ALF filter may be referred to as "full ALF 124." Full ALF 124 is also symmetric in that the number of taps or coefficients on each of the x-axis and y-axis are the same. Full ALF 124 includes two coefficients above and below the x-axis and four coefficients to the right and left of the y-axis. Consequently, ALF 124 may be referred to as "symmetric ALF 124" or "symmetric full ALF 124." It is assumed that filter unit 63 selected symmetric full ALF 124 and has applied symmetric full ALF 124 to the top 10 rows of video block 120.

Rather than adapt symmetric full ALF 124, filter unit 63 may perform mirror padding to replicate pixel values of the bottom row (which are shown in the example of FIG. 5A as diagonally cross-hashed squares) and mirroring these pixels to replace what would be the top-most row of pixel values of the block located adjacent and below video block 120. Additionally, filter unit 63 may, to filter the very last row of video block 124, performing mirror padding to mirror both the bottom most row of video block 124 and the second-to-bottom most row of video block 124 (which is shown in the example of FIG. 5 as horizontally and vertically cross-hashed squares). Filter unit 63 may effectively form two additional rows denoted as "mirror padding 126" that replace the top-two most rows of the block adjacent to and below video block 124, thereby enabling the application of full ALF 124.

While shown in the example of FIG. 5A as actually creating these rows, which implies that a line buffer may be required to store these pixel values, the techniques may be implemented mathematically to avoid the actual storage requirements. That is, the pixel values shown in mirror padding 126 to which full ALF 124 are applied may simply be taken (either in original form of potentially in scaled form) from the bottom two rows of video block 124 and inserted into the filter matrix without actually having to replicate and store these values to separate line buffers. As a result, the mirror padding techniques described in this disclosure do not result in a line buffer size increase, but may potentially provide the speed and line buffer benefits noted above.

FIG. 5B illustrates application of the mirror padding aspects with respect to a more interior row of video block 120. In this sense, the term "boundary" is used in this disclosure to denote a boundary between two portions of video data, where these portions may reside within the same video block or in different video blocks. Thus, the term "boundary" should not be construed as limited to a boundary separating two video blocks, but may include any boundary (including the so-called "virtual boundary" discussed above) that may separate any two portions of video data. That is, filter unit 63 may, in some instances, perform mirror padding of interior rows, such as the fifth row from the bottom of video block 120 to mirror available pixel values in the fifth row to replace unavailable pixel values (from an ALF perspective) located in the fourth row from the bottom of video block 120, effectively creating mirror padding 128. Again, filter unit 63 effectively creates padding 128 in that mirror padding 128 may not actually be stored but rather implemented in such a manner that the available pixel values are provided to the corresponding coefficients located in mirror padding 128. In this respect, the techniques may be applied to interior or any row or column of a video block and should not be limited to an edge or boundary of a video block.

Figure 6:
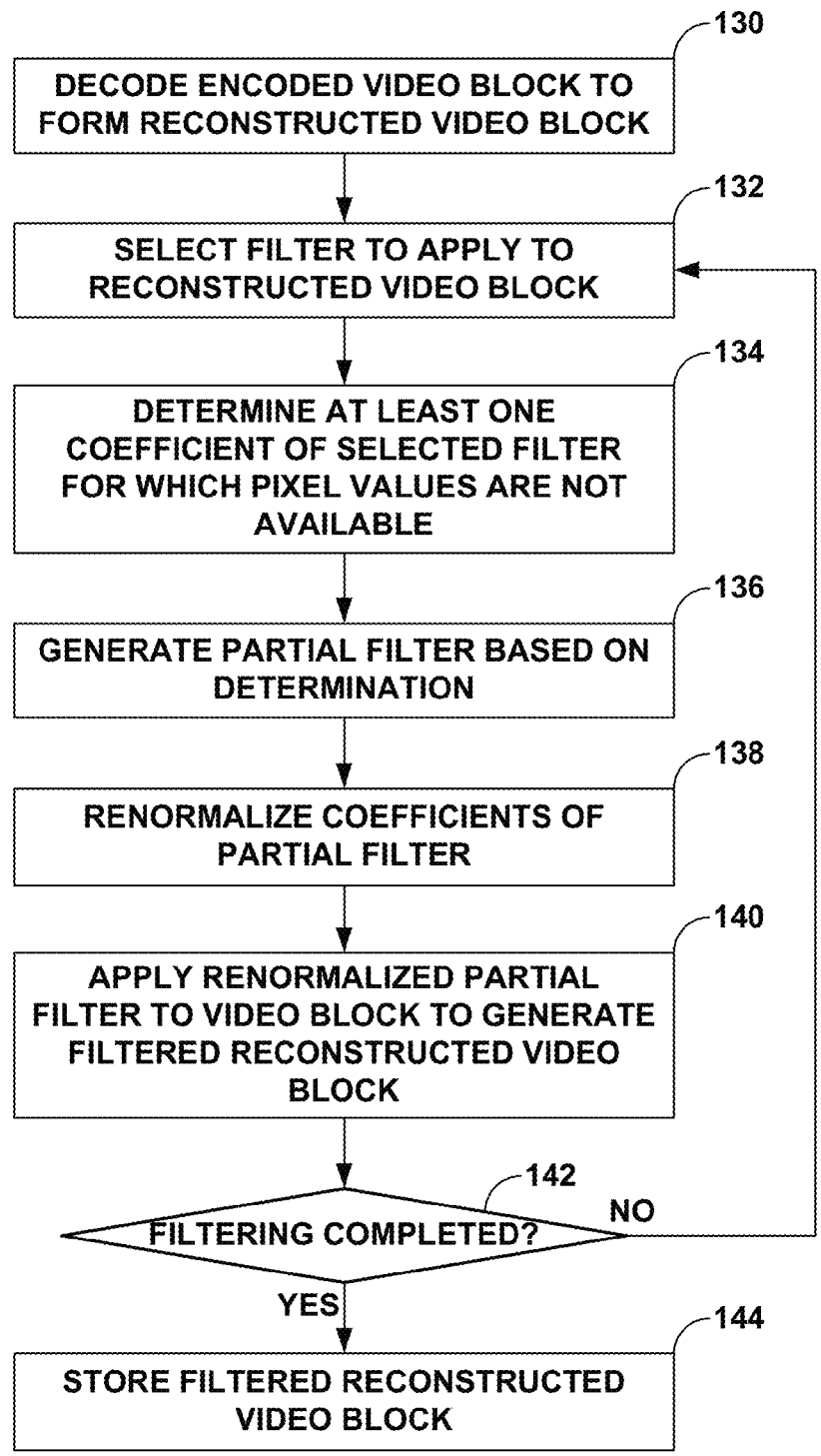
FIG. 6 is a flowchart illustrating exemplary operation of a video coder in implementing the partial filtering aspects of the techniques described in this disclosure.

FIG. 6 is a flowchart illustrating exemplary operation of a video coder, such as video encoder 20 or video decoder 30 shown in the examples of FIGS. 1-3, in implementing the partial filtering aspects of the techniques described in this disclosure. While the techniques are described with respect to a particular video coder, i.e., video encoder 20 shown in the example of FIG. 2, the techniques may be implemented by any video coder, such as video decoder 30 shown in the example of FIG. 3. In addition, while described with respect to a particular type of content data, i.e., video data, the techniques may generally be implemented with respect to any type of content data, including audio data, text data, image date, and the like.

Initially, video encoder 20 encoded video data in the manner described above to generate encoded video data. To encode this video data, video encoder 20, after encoding the video data to generate encoded video data, decodes the encoded video data to form reconstructed video data, which is used to encode subsequent video data. As a result, video encoder 20 may decode encoded video blocks to form reconstructed video blocks, such as video block 100 shown in the examples of FIGS. 4A-4E (130). Video encoder 20 may invoke filtering unit 63 to filter video block 100. To filter video block 100, filtering unit 63 may select a filter to apply to reconstructed video block 100 (132). After selecting the filter, filtering unit 63 may apply the filter to reconstructed video block 100. In some instances, filtering unit 63 may determine that at least one coefficient of the selected filter is to be applied to at least one pixel value that is not available for reasons described above in more detail (134).

In response to determining that the at least one coefficient of the selected filter is to be applied to the at least one pixel value that is not available, filtering unit 63 may generate a partial filter, such as partial filters 108A, 108B, 110A, 110B shown in the examples of FIGS. 4A-4E, in the manner described above (136). Filtering unit 63 may, after generating this partial filter, renormalize the coefficients of the partial filter such that these coefficients once again sum to one (138). Filtering unit 63 may renormalize the filter coefficients according to one or more renormalization algorithms.

For example, filtering unit 63 may employ a first renormalization algorithm to renormalize the coefficients of the generated partial filter. The first renormalization algorithm includes summing the plurality of filter coefficients included within the selected full filter to compute a first sum of the plurality of full filter coefficients. In other words, filtering unit 63 may sum the filter coefficients of the selected filter. This algorithm also includes summing the plurality of filter coefficients included within the partial filter to compute a second sum of the plurality of partial filter coefficients. That is, filtering unit 63 may sum the coefficients of the partial filter. Filtering unit 63 may then determine the renormalized coefficients of the partial filter by multiplying each of the plurality of filter coefficients included within the partial filter by the result of dividing the first sum of the plurality of full filter coefficients by the second sum of the plurality of partial filter coefficients. This first renormalization algorithm may be expressed as the following pseudo-code:

$\text{Coeff\_all} = C\_1 + C\_2 + \ldots + C\_N$ $\text{Coeff\_part} = \text{Coeff\_all} - (C\_1 + \ldots + C\_M)$ New coeffs $C\_i' = C\_i * \text{Coeff\_all}/\text{Coeff\_part}$,
$i = M+1, \ldots, N$, where the variable "Coeff_all" denotes the sum of the coefficients $C\_1, \ldots, C\_N$ of the selected filter, the variable "Coeff_part" denotes the result of subtracting the sum of the un-normalized coefficients $C\_1, \ldots, C\_M$ of the partial filter from Coeff_all, and the last line refers to the new coefficients ("coeffs") of the partial filter that are renormalized by multiplying the removed coefficients ($C\_i$, where $i = M+1, \ldots, N$) by the result of dividing Coeff_all by Coeff_part.

Alternatively, filtering unit 63 may implement a second renormalization algorithm that involves adding one or more of the at least one of the plurality of filter coefficients of the full filter (meaning the selected filter) for which content data will not be available to be filtered to the one or more of the plurality of filter coefficients of the partial filter. This second renormalization algorithm may be expressed according to the following pseudo-code:

For subset of C_i, i=M+1, . . . ,N, add C_k, k=1, . . . ,M
For example, $$C\_(M+1)'=C\_(M+1)+C\_1, C\_(M+2)'=C\_(M+2)+C\_3, \ldots \text{ or}$$

$$C\_L'=C\_L+(C\_1+C\_2+\ldots+C\_M).$$

According to this pseudo-code, the coefficients of the selected filter for which pixel values are not available are denoted as $C\_i$, where i=M+1, . . . , N. The coefficients of the un-normalized partial filter are denoted as $C\_k$, where k=1, . . . , M. The pseudo-code for this second algorithm also provides two examples of how the removed coefficients may be added to the coefficients of the partial filter to renormalize this filter. In the first example, C_(M+1)' denotes a coefficient of the renormalized partial filter, which is computed as the addition of the un-normalized coefficient of the partial filter C_(M+1) to C_1. In the first example, the removed coefficients denoted as C_(M+1), C_(M+2), etc. are added to the remaining coefficients C_1, C_2, etc. In the second example, C_L' denotes the normalized coefficient which is normalized by adding to the original unnormalized remaining coefficient C_L the removed coefficients C_1, C_2, . . . , C_M.

In some instances, renormalization may be performed by selecting different pre-defined partial filters based on a computed distance from the so-called "virtual boundary" described above. A table may specify the filter coefficients based on this computed distance from the virtual boundary, which have already been renormalized.

In any event, after renormalizing the partial filter coefficients, filtering unit 63 may apply the renormalized partial filter to video block 100 to generate a filtered reconstructed video block (140). Filtering unit 63 may then determine whether filtering of this video block 100 is complete (142). As noted above, filtering unit 63 may apply a number of filters in a cascaded fashion, each of which may be applied in accordance with the partial filtering techniques described in this disclosure. In some instances, one or more of these filters may not be applied. Additionally, as noted above, filtering unit 63 may adaptively apply these filters, employing, as one example, one or more thresholds to determine when to perform partial filtering and/or the mirror padding aspects of the techniques described in this disclosure. If filtering unit 63 determines that filtering has not yet been completed ("NO" 142), filtering unit 63 may continue in the manner described above to filter video block 100 (132-142). If filtering unit 63 determines that filtering has been completed ("YES" 142), filtering unit 63 may store filtered reconstructed video block 100 to reference picture memory 64 (144).

Figure 7:
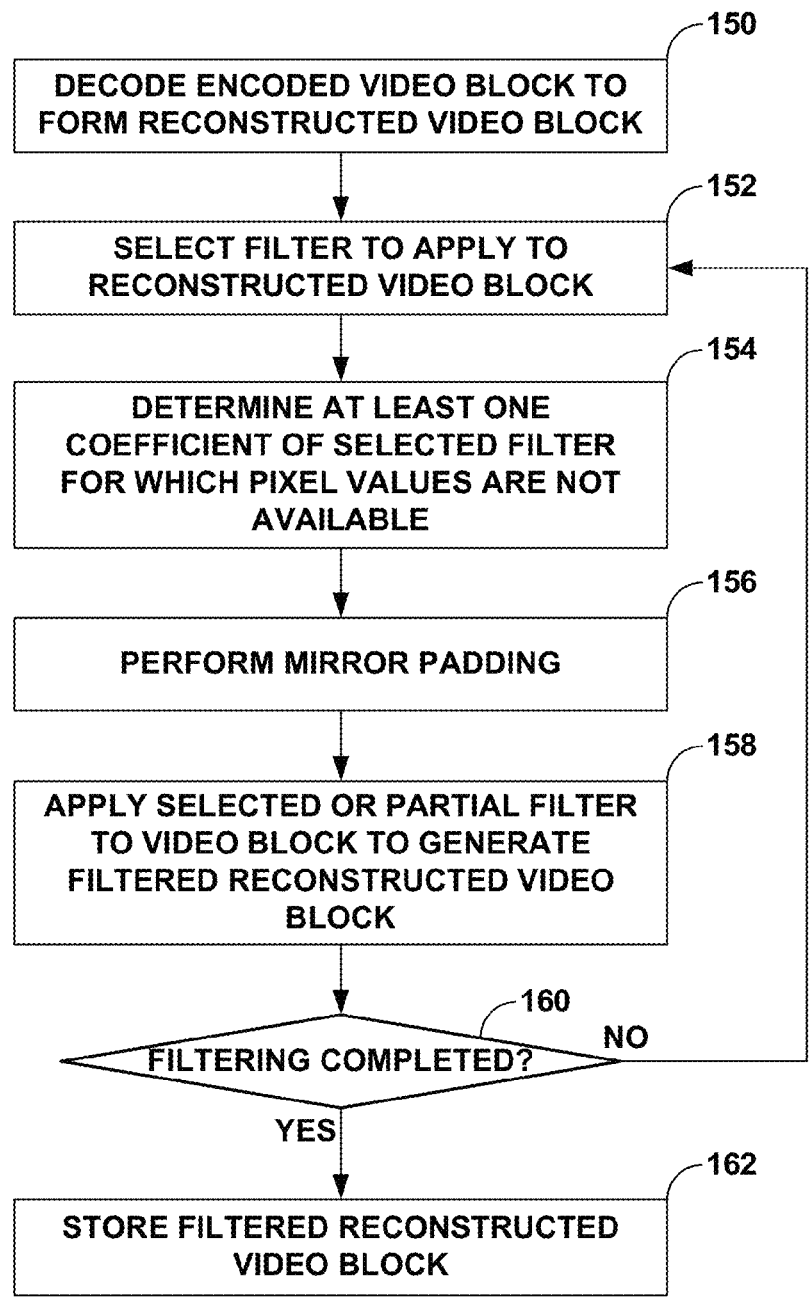
FIG. 7 is a flowchart illustrating exemplary operation of a video coder in implementing the mirror padding aspects of the techniques described in this disclosure.

FIG. 7 is a flowchart illustrating exemplary operation of a video coder, such as video encoder 20 or video decoder 30 shown in the examples of FIGS. 1-3, in implementing the mirror padding aspects of the techniques described in this disclosure. While the techniques are described with respect to a particular video coder, i.e., video encoder 20 shown in the example of FIG. 2, the techniques may be implemented by any video coder, such as video decoder 30 shown in the example of FIG. 3. In addition, while described with respect to a particular type of content data, i.e., video data, the techniques may generally be implemented with respect to any type of content data, including audio data, text data, image date, and the like.

Initially, video encoder 20 encoded video data in the manner described above to generate encoded video data. To encode this video data, video encoder 20, after encoding the video data to generate encoded video data, decodes the encoded video data to form reconstructed video data, which is used to encode subsequent video data. As a result, video encoder 20 may decode encoded video blocks to form reconstructed video blocks, such as video block 120 shown in the examples of FIGS. 4A-4E (150). Video encoder 20 may invoke filtering unit 63 to filter video block 120. To filter video block 120, filtering unit 63 may select a filter to apply to reconstructed video block 100 (152). After selecting the filter, filtering unit 63 may apply the filter to reconstructed video block 120. In some instances, filtering unit 63 may determine that at least one coefficient of the selected filter is to be applied to at least one pixel value that is not available for reasons described above in more detail (154).

In response to determining that the at least one coefficient of the selected filter is to be applied to the at least one pixel value that is not available, filtering unit 63 may perform mirror padding in the manner described above (156). Filtering unit 63 may, after performing mirror padding, apply either the selected or partial filter to video block 120 to generate a filtered reconstructed video block, where the partial filter may be determined in the manner described above (158). Filtering unit 63 may then determine whether filtering of this video block 120 is complete (160). As noted above, filtering unit 63 may apply a number of filters in a cascaded fashion, each of which may be applied in accordance with the partial filtering techniques described in this disclosure. In some instances, one or more of these filters may not be applied. Additionally, as noted above, filtering unit 63 may adaptively apply these filters, employing, as one example, one or more thresholds to determine when to perform partial filtering and/or the mirror padding aspects of the techniques described in this disclosure. If filtering unit 63 determines that filtering has not yet been completed ("NO" 160), filtering unit 63 may continue in the manner described above to filter video block 120 (152-160). If filtering unit 63 determines that filtering has been completed ("YES" 160), filtering unit 63 may store filtered reconstructed video block 120 to reference picture memory 64 (162).

In this way, various aspect of the techniques may be directed to a method of decoding encoded video data to generate reconstructed video data. This method may comprise, when decoding the encoded video data, performing, with the device, mirror padding to mirror pixel values located at a boundary of a first portion of the reconstructed video data so as to replace pixel values of a second portion of the video data that are not available, wherein the boundary separates the first portion of the video data from the second portion of the video data. The method may further comprise applying, with the device, one or more filters to filter at least one of the mirrored pixel values.

In some instances, the filters comprise one or more of a deblocking (DB) filter, a sample adaptive offset (SAO) filter, and an adaptive loop filter (ALF). In other instances, the portion comprises a largest coding unit (LCU), and the method includes applying the one or more filters at a level of the LCU rather than the slice or frame level to filter the LCU.

In some aspects, the method comprises adaptively applying the one or more filters based on one or more criteria. In other aspects, applying the one or more filters comprises selecting a full filter comprising a plurality of filter coefficients, determining at least one of the plurality of filter coefficients for which the video data will not be available to be filtered, and, based on the determination of the at least one of the plurality of filter coefficients for which the video data will not be available to be filtered, determining a partial filter. The partial filter may not include the at least one of the plurality of filter coefficients for which the video data will not be available to be filtered. Applying the filter may also comprise renormalizing the plurality of filter coefficients included within the partial filter and applying the renormalized partial filter to filter at least one of the mirrored pixel values.

In some instances, the device that performs the method comprises a video encoder, where, in these instances, the method further comprises encoding video data with the video encoder to generate the encoded video data, and where decoding the encoded video data comprises decoding the encoded video data to generate reconstructed video data for use as reference data when encoding the video data. Alternatively, the device may comprise a video decoder.

In some instances, the device comprises means for performing each of the steps of the method described above. In other instances, the device comprises one or more processors to perform the steps of the method described above. In still other instances, a non-transitory computer-readable medium stores instructions that, when executed, cause one or more processor to perform the method described above.

Various aspects of the techniques may be incorporated or otherwise described in more detail in the above noted HEVC working draft. For example, the current version of the HEVC working draft has incorporated aspects of the techniques described in this disclosure related to partial filtering. These partial filtering techniques are set forth in section 8.7.4.3 of the most recent version of the HEVC working draft set forth during the 9$^{th}$ meeting in Geneva, CH, which occurred from 27 Apr. 2012 through 7 May 2012. This version of the HEVC working draft was promulgated by the Joint Collaborative Team on Video Coding (JCT-VC) of ITU-T SG16 WP3 and ISO/IEC JTC1/SC29/WG11. Section 8.7.4.3 of this version of the HEVC working draft is set forth below, where reference to various elements, variables and other items may be more fully understood in view of the HEVC working draft as set forth in its entirety. As a result, a detailed explanation of each of these elements, variable and other items is not provided in full.

8.7.4.3 Coding Tree Block Filtering Process for Luma Samples
Inputs of this process are:
  a reconstructed luma picture sample array prior to ALF recPicture,
  a filtered reconstructed luma picture sample array alfPicture
  a (AlfNumFilters)x(19) array of luma filter coefficients $c_L$.

Output of this process is the modified filtered reconstructed luma picture sample array alfPicture.

For each luma coding block in the current luma coding tree block with location (xC, yC) specifying the top-left luma sample of the coding block relative to the top left luma sample of the current picture and size cbSize equal to (1<<log 2CbSize), depending on pcm_flag, pcm_loop_filter_disable_flag, and cu_transquant_bypass_flag of the respective coding unit, the following applies:
  If one or more of the following conditions are true, the adaptive loop filter process is not applied for the current coding block.
    pcm_loop_filter_disable_flag is equal to 1 and pcm_flag is equal to 1.
    cu_transquant_bypass_flag is equal to 1.
  Otherwise, the following applies.
    The coding block boundary padding process as specified in subclause 8.7.4.5 is invoked with the reconstructed picture sample array recPicture prior to ALF, the luma location (xC, yC), the current coding block size cbSize, the granularity block size gbSize set equal to Min(cbSize, (CtbSize>>slice_granularity)) as inputs and the output is the padded luma sample array padBlock.
    The filter index array derivation process specified in subclause 8.7.3.3 is invoked with the luma location (xC, yC) and the size of the coding block cbSize as inputs, and the output is the two-dimensional filter index array fIdx.
  A variable vbLine is set equal to CtbSize−4.
  Filtered samples of luma picture sample array alfPicture[xC+x, yC+y] with x, y=0 . . . (cbSize)−1, are derived by the following ordered steps:
    1. A variable dist2VB is derived as follows.
      If (yC+CtbSize) is greater than or equal to pic_height_in_luma_samples, dist2VB is set equal to 5.
      Otherwise, dist2VB is set equal to (((yC+y) % CtbSize)−vbLine).
    2. The variables horPos[i] and verPos[i] are specified in Table 8-14 and Table 8-15, respectively.
    3. The variable filtIdx used to index the filter coefficients in $c_L$ is derived as follows.

filtIdx=MapFiltFidx[fIdx[x, y]]    (8-328)

4. The filtered sample value is derived as follows.

alfPicture[xC+x, yC+y]=Σ$_i$(padBlock[4+x+horPos[i], 4+y+verPos[i]]*$c_L$[filtIdx][i])    (8-329)

with i=0 . . . 18

5. The filtered sample value is clipped as follows.

alfPicture[xC+x, yC+y]=Clip1$_Y$((alfPicture[xC+x, yC+y]+(1<<(8−1)))>>8)    (8-330)

TABLE 8-14

Specification of horPos[i] for adaptive loop filter process

| i | | | | | 0 | 1 | 2 | 3 | 4 | 5 | 6 | 7 | 8 |
|---|---|---|---|---|---|---|---|---|---|---|---|---|---|
| horPos[i] | 1 | 4 | 3 | 2 | 1 | | | | 1 | | | | |

TABLE 8-15

Specification of verPos[i] for adaptive loop filter process

| i | 0 | 1 | 2 | 3 | 4 | 5 | 6 | 7 | 8 |
|---|---|---|---|---|---|---|---|---|---|
| dist2VB < −3 or dist2VB > 2 | 3 | 2 | 1 | 1 | 1 | | | | |
| dist2VB == −3 or dist2VB == 2 | | 2 | 1 | 1 | 1 | | | | |
| dist2VB == −2 or dist2VB == 1 | | | 1 | 1 | 1 | | | | |
| dist2VB == −1 or dist2VB == 0 | | | | | | | | | |

8.7.4.3.1 Coding Block Filter Index Array Derivation Process for Luma Samples

Inputs of this process are:
- a location (xC, yC) specifying the top-left sample of the current coding block relative to the top-left sample of the current picture,
- a variable cbSize specifying the size of the current coding block.

Output of this process is the two-dimensional filter index array of (cbSize)x(cbSize), fIdx.

The filter index array fIdx is derived as the following ordered steps:

1. The variables xIdx and yIdx are derived as regionTab[16]={0, 1, 4, 5, 15, 2, 3, 6, 14, 11, 10, 7, 13, 12, 9, 8}  (8-331)

xInterval=(((PicWidthInCtbs+1)>>2)<<Log 2Ctb-Size))  (8-332)

If xInterval is equal to 0, xIdx is set equal to 3.
    Otherwise, xIdx is set equal to Min(3, xC/xInterval).

yInterval=(((PicHeightInCtbs+1)>>2)<<Log 2Ctb-Size))  (8-333)

If yInterval is equal to 0, yIdx is set equal to 3.
    Otherwise, yIdx is set equal to Min(3, yC/yInterval).

2. The filter index values fIdx[x, y] with x, y=0 . . . (cbSize)−1 are derived as fIdx[x, y]=regionTab[(yIdx<<2)+xIdx]  (8-334)

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware, software, firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium that is a physical non-transitory structure, and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The techniques described in this disclosure may be implemented using any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the techniques have been described. These and other aspects are within the scope of the following claims.

What is claimed is:

1. A method of coding video data comprising:
    selecting a filter to apply near a boundary of a first portion of the video data that separates the first portion of the video data from a second portion of the video data, wherein the filter comprises a plurality of filter coefficients;
    determining at least one of the plurality of filter coefficients for which the video data will not be available to be filtered;
    based on the determination of the at least one of the plurality of filter coefficients for which the video data will not be available to be filtered, determining a partial filter, wherein the partial filter does not include the at least one of the plurality of filter coefficients for which the video data will not be available to be filtered;
    renormalizing the plurality of filter coefficients included within the partial filter in accordance with either a first renormalization algorithm or a second renormalization algorithm, wherein the first renormalization algorithm comprises:
    summing the plurality of filter coefficients included within the selected full filter to compute a first sum of the plurality of full filter coefficients;
    summing the plurality of filter coefficients included within the partial filter to compute a second sum of the plurality of partial filter coefficients; and
    computing the plurality of filter coefficients for the partial filter by multiplying each of the plurality of filter coefficients included within the partial filter by the result of dividing the first sum of the plurality of full filter coefficients by the second sum of the plurality of partial filter coefficients, and
wherein the second renormalization algorithm comprises adding one or more of the at least one of the plurality of filter coefficients of the full filter for which video data will not be available to be filtered to the one or more of the plurality of filter coefficients of the partial filter; and
applying the renormalized partial filter near the boundary of the first portion of the video data to generate a filtered first portion of the video data.

2. The method of claim 1, wherein selecting the filter comprises selecting one or more of a type, a size, and a shape of the filter.

3. The method of claim 1, wherein the selected filter comprises one of a deblocking (DB) filter, a sample adaptive offset (SAO) filter, and an adaptive loop filter (ALF).

4. The method of claim 1,
wherein the portion comprises a largest coding unit (LCU), and
wherein applying the one or more partial filters to filter the portion of the video data comprises applying the one or more partial filters at a level of the LCU, rather than at a level of a slice or a frame, to filter the LCU.

5. The method of claim 1, wherein applying one or more partial filters comprises adaptively applying the one or more partial filters based on one or more criteria.

6. The method of claim 1,
wherein determining a partial filter comprises determining an asymmetric partial filter,
wherein the asymmetric partial filter includes one or more of the plurality of filter coefficients of the full filter for which the video data will be available to be filtered arranged in an asymmetric manner about one or more of an x-axis and a y-axis of the asymmetric partial filter.

7. The method of claim 1,
wherein determining a partial filter comprises determining a symmetric partial filter,
wherein the symmetric partial filter includes one or more of the plurality of filter coefficients of the full filter for which the video data will be available to be filtered arranged in a symmetric manner about one or more of an x-axis and a y-axis of the symmetric partial filter.

8. The method of claim 1, further comprising performing mirror padding to mirror pixel values located at the boundary of the first portion of the video data so as to replace pixel values of a second portion of the video data that are not available, and
wherein applying the renormalized partial filter comprises applying the renormalized partial filter to filter at least one of the mirrored pixel values.

9. The method of claim 1, wherein the method further comprises:
    encoding the video data with a video encoder to generate encoded video data, and
    decoding the encoded video data with the video encoder to generate reconstructed video data for use as reference data when encoding the video data.

10. The method of claim 1, further comprising:
performing entropy decoding to entropy decode the first portion of the video data to produce transform coefficients;
performing inverse quantization to de-quantize the transform coefficients and generate de-quantized transform coefficients;
performing an inverse transform to transform the de-quantized transform coefficients from a frequency domain to a spatial domain and generate residual video data; and
reconstructing the video data from the residual video data to generate a reconstructed version of the first portion of the video data.

11. A device for coding video data comprising:
means for selecting a filter to apply near a boundary of a first portion of the video data that separates the first portion of the video data from a second portion of the video data, wherein the filter comprises a plurality of filter coefficients;
means for determining at least one of the plurality of filter coefficients for which the video data will not be available to be filtered;
based on the determination of the at least one of the plurality of filter coefficients for which the video data will not be available to be filtered, means for determining a partial filter, wherein the partial filter does not include the at least one of the plurality of filter coefficients for which the video data will not be available to be filtered;
means for renormalizing the plurality of filter coefficients included within the partial filter in accordance with either a first renormalization algorithm or a second renormalization algorithm,
wherein the first renormalization algorithm comprises:
    summing the plurality of filter coefficients included within the selected full filter to compute a first sum of the plurality of full filter coefficients;
    summing the plurality of filter coefficients included within the partial filter to compute a second sum of the plurality of partial filter coefficients; and
    computing the plurality of filter coefficients for the partial filter by multiplying each of the plurality of filter coefficients included within the partial filter by the result of dividing the first sum of the plurality of full filter coefficients by the second sum of the plurality of partial filter coefficients, and
wherein the second renormalization algorithm comprises adding one or more of the at least one of the plurality of filter coefficients of the full filter for which video data will not be available to be filtered to the one or more of the plurality of filter coefficients of the partial filter; and
means for applying the renormalized partial filter near the boundary of the first portion of the video data to generate a filtered first portion of the video data.

12. The device of claim 11, wherein the means for selecting the filter comprises means for selecting one or more of a type, a size, and a shape of the filter.

13. The device of claim 11, wherein the selected filter comprises one of a deblocking (DB) filter, a sample adaptive offset (SAO) filter, and an adaptive loop filter (ALF).

14. The device of claim 11,
wherein the portion comprises a largest coding unit (LCU), and
wherein the means for applying the one or more partial filters to filter the portion of the video data comprises means for applying the one or more partial filters at a level of the LCU, rather than at a level of a slice or a frame, to filter the LCU.

15. The device of claim 11, wherein the means for applying one or more partial filters comprises means for adaptively applying the one or more partial filters based on one or more criteria.

16. The device of claim 11,
wherein the means for determining a partial filter comprises means for determining an asymmetric partial filter,
wherein the asymmetric partial filter includes one or more of the plurality of filter coefficients of the full filter for which the video data will be available to be filtered arranged in an asymmetric manner about one or more of an x-axis and a y-axis of the asymmetric partial filter.

17. The device of claim 11,
wherein the means for determining a partial filter comprises means for determining a symmetric partial filter,
wherein the symmetric partial filter includes one or more of the plurality of filter coefficients of the full filter for which the video data will be available to be filtered arranged in a symmetric manner about one or more of an x-axis and a y-axis of the symmetric partial filter.

18. The device of claim 11, further comprising means for performing mirror padding to mirror pixel values located at the boundary of the first portion of the video data so as to replace pixel values of a second portion of the video data that are not available, and
wherein the means for applying the renormalized partial filter comprises means for applying the renormalized partial filter to filter at least one of the mirrored pixel values.

19. A device for coding video data comprising:
a memory configured to store a first portion of the video data; and
one or more processors configured to:
select a filter to apply near a boundary of the first portion of the video data that separates the first portion of the video data from a second portion of the video data, wherein the filter comprises a plurality of filter coefficients;
determine at least one of the plurality of filter coefficients for which the video data will not be available to be filtered, based on the determination of the at least one of the plurality of filter coefficients for which the video data will not be available to be filtered; determine a partial filter, wherein the partial filter does not include the at least one of the plurality of filter coefficients for which the video data will not be available to be filtered; renormalize the plurality of filter coefficients included within the partial filter in accordance with either a first renormalization algorithm or a second renormalization algorithm,
wherein the first renormalization algorithm comprises:
summing the plurality of filter coefficients included within the selected full filter to compute a first sum of the plurality of full filter coefficients;
summing the plurality of filter coefficients included within the partial filter to compute a second sum of the plurality of partial filter coefficients; and
computing the plurality of filter coefficients for the partial filter by multiplying each of the plurality of filter coefficients included within the partial filter by the result of dividing the first sum of the plurality of full filter coefficients by the second sum of the plurality of partial filter coefficients, and
wherein the second renormalization algorithm comprises adding one or more of the at least one of the plurality of filter coefficients of the full filter for which video data will not be available to be filtered to the one or more of the plurality of filter coefficients of the partial filter; and
apply the renormalized partial filter near the boundary of the first portion of the video data to generate a filtered first portion of the video data.

20. The device of claim 19, wherein the one or more processors are further configured to select one or more of a type, a size, and a shape of the filter.

21. The device of claim 19, wherein the selected filter comprises one of a deblocking (DB) filter, a sample adaptive offset (SAO) filter, and an adaptive loop filter (ALF).

22. The device of claim 19,
wherein the portion comprises a largest coding unit (LCU), and
wherein the one or more processors are further configured to apply the one or more partial filters at a level of the LCU, rather than at a level of a slice or a frame, to filter the LCU.

23. The device of claim 19, wherein the one or more processors are further configured to adaptively apply the one or more partial filters based on one or more criteria.

24. The device of claim 19,
wherein the one or more processors are further configured to determine an asymmetric partial filter,
wherein the asymmetric partial filter includes one or more of the plurality of filter coefficients of the full filter for which the video data will be available to be filtered arranged in an asymmetric manner about one or more of an x-axis and a y-axis of the asymmetric partial filter.

25. The device of claim 19,
wherein the one or more processors are further configured to determine a symmetric partial filter,
wherein the symmetric partial filter includes one or more of the plurality of filter coefficients of the full filter for which the video data will be available to be filtered arranged in a symmetric manner about one or more of an x-axis and a y-axis of the symmetric partial filter.

26. The device of claim 19, wherein the one or more processors are further configured to perform mirror padding to mirror pixel values located at the boundary of the first portion of the video data so as to replace pixel values of a second portion of the video data that are not available and apply the renormalized partial filter to filter at least one of the mirrored pixel values.

27. The device of claim 19,
wherein the device comprises a video encoder,
wherein the one or more processors are further configured to encode the video data with the video encoder to generate encoded video data, and decode the encoded video data to generate reconstructed video data for use as reference data when encoding the video data.

28. The device of claim 19, wherein the device comprises a video decoder.

29. A non-transitory computer-readable storage medium comprising instructions stored thereon that, when executed, cause one or more processors of a video coding device to:

select a filter to apply near a boundary of a first portion of the video data that separates the first portion of the video data from a second portion of the video data, wherein the filter comprises a plurality of filter coefficients;

determine at least one of the plurality of filter coefficients for which the video data will not be available to be filtered;

based on the determination of the at least one of the plurality of filter coefficients for which the video data will not be available to be filtered, determine a partial filter, wherein the partial filter does not include the at least one of the plurality of filter coefficients for which the video data will not be available to be filtered;

renormalize the plurality of filter coefficients included within the partial filter in accordance with either a first renormalization algorithm or a second renormalization algorithm, wherein the first renormalization algorithm comprises:
summing the plurality of filter coefficients included within the selected full filter to compute a first sum of the plurality of full filter coefficients;
summing the plurality of filter coefficients included within the partial filter to compute a second sum of the plurality of partial filter coefficients; and
computing the plurality of filter coefficients for the partial filter by multiplying each of the plurality of filter coefficients included within the partial filter by the result of dividing the first sum of the plurality of full filter coefficients by the second sum of the plurality of partial filter coefficients, and wherein the second renormalization algorithm comprises adding one or more of the at least one of the plurality of filter coefficients of the full filter for which video data will not be available to be filtered to the one or more of the plurality of filter coefficients of the partial filter; and apply the renormalized partial filter near the boundary of the first portion of the video data to generate a filtered first portion of the video data.

30. The non-transitory computer-readable storage medium of claim 29, wherein the instructions that, when executed, cause the one or more processors to select the filter comprises instructions that, when executed cause the one or more processors to select one or more of a type, a size, and a shape of the filter.

31. The non-transitory computer-readable storage medium of claim 29, wherein the filter comprises one of a deblocking (DB) filter, a sample adaptive offset (SAO) filter, and an adaptive loop filter (ALF).

32. The non-transitory computer-readable storage medium of claim 29,
wherein the portion comprises a largest coding unit (LCU), and
wherein the instructions, when executed, that cause the one or more processors to apply one or more partial filters comprise instructions that, when executed, cause the one or more processor to the apply the one or more partial filters at a level of the LCU, rather than at a level of a slice or a frame, to filter the LCU.

33. The non-transitory computer-readable storage medium of claim 29, wherein the instructions, when executed, that cause the one or more processor to apply one or more partial filters comprise instructions that, when executed, cause the one or more processor to adaptively apply the one or more partial filters based on one or more criteria.

34. The non-transitory computer-readable storage medium of claim 29,
wherein the instructions, when executed, that cause the one or more processor to determine a partial filter comprise instructions that, when executed, cause the one or more processor to determine an asymmetric partial filter,
wherein the asymmetric partial filter includes one or more of the plurality of filter coefficients of the full filter for which the video data will be available to be filtered arranged in an asymmetric manner about one or more of an x-axis and a y-axis of the asymmetric partial filter.

35. The non-transitory computer-readable storage medium of claim 29,
wherein the instructions, when executed, that cause the one or more processor to determine a partial filter comprise instructions that, when executed, cause the one or more processor to determine a symmetric partial filter,
wherein the symmetric partial filter includes one or more of the plurality of filter coefficients of the full filter for which the video data will be available to be filtered arranged in a symmetric manner about one or more of an x-axis and a y-axis of the symmetric partial filter.

36. The non-transitory computer-readable storage medium of claim 29, further comprising instructions that, when executed cause the one or more processors to perform mirror padding to mirror pixel values located at the boundary of the first portion of the video data so as to replace pixel values of a second portion of the video data that are not available, and
wherein the instructions, when executed, that cause the one or more processor to apply the renormalized partial filter comprise instructions that, when executed, cause the one or more processor to apply the renormalized partial filter to filter at least one of the mirrored pixel values.

37. The method of claim 1, the method being executable on a wireless communication device, wherein the device comprises:
a receiver configured to receive the video data;
a memory a memory configured to store the video data; and
a processor configured to execute instructions to process the video data stored in said memory to select the filter, determine the at least one of the plurality of filter coefficients for which the video data will not be available to be filtered, determine the partial filter, renormalize the plurality of filter coefficients, and apply the renormalized partial filter.

38. The method of claim 37, wherein the wireless communication device is a cellular telephone and the video data is received by the receiver and modulated according to a cellular communication standard.

39. The device of claim 19, wherein the device is a wireless communication device, further comprising a receiver configured to receive the video data.

40. The device of claim 39, wherein the wireless communication device is a cellular telephone and the video data is received by the receiver and modulated according to a cellular communication standard.

* * * * *